(12) United States Patent
Ayers et al.

(10) Patent No.: US 9,410,405 B2
(45) Date of Patent: Aug. 9, 2016

(54) COMPOSITIONS AND METHODS FOR ENHANCED HYDROCARBON RECOVERY

(75) Inventors: Jeffrey T. Ayers, South Windsor, CT (US); George E. Hoag, South Windsor, CT (US); Douglas K. Anderson, South Windsor, CT (US); John B. Collins, South Windsor, CT (US)

(73) Assignee: Ethical Solutions, LLC, South Windsor, CT (US)

( * ) Notice: Subject to any disclaimer, the term of this patent is extended or adjusted under 35 U.S.C. 154(b) by 0 days.

(21) Appl. No.: 14/361,685

(22) PCT Filed: Nov. 30, 2011

(86) PCT No.: PCT/US2011/062697
§ 371 (c)(1),
(2), (4) Date: May 29, 2014

(87) PCT Pub. No.: WO2013/081609
PCT Pub. Date: Jun. 6, 2013

(65) Prior Publication Data
US 2014/0332212 A1     Nov. 13, 2014

(51) Int. Cl.
*E21B 43/16* (2006.01)
*C09K 8/58* (2006.01)
*C09K 8/584* (2006.01)

(52) U.S. Cl.
CPC . *E21B 43/16* (2013.01); *C09K 8/58* (2013.01); *C09K 8/584* (2013.01)

(58) Field of Classification Search
CPC ........ C09K 19/56; C09K 8/58; C09K 19/408; C09K 8/584; E21B 43/16
See application file for complete search history.

(56) References Cited

U.S. PATENT DOCUMENTS

| | | | |
|---|---|---|---|
| 4,688,637 | A | 8/1987 | Theis |
| 5,238,066 | A | 8/1993 | Beattie et al. |
| 5,934,390 | A | 8/1999 | Uthe |
| 2006/0169455 | A1 | 8/2006 | Everett et al. |
| 2011/0214868 | A1 | 9/2011 | Funkhouser et al. |

FOREIGN PATENT DOCUMENTS

WO     2011047059 A1     4/2011

OTHER PUBLICATIONS

International Search Report and Written Opinion dated Mar. 21, 2012 (PCT/US2011/062697).

*Primary Examiner* — Zakiya W Bates
(74) *Attorney, Agent, or Firm* — Alix, Yale & Ristas, LLP

(57) ABSTRACT

A method of using a fluid formulation for increasing flow, production, or recovery of oil and gas hydrocarbons from a subterranean formation. Components including a peroxygen, surfactant, alkali metal chelate, and a cosolvent into a hydrocarbon bearing subterranean formation having a blockage or accumulation of material. Oxygen or carbon dioxide gas is generated by decomposition of the peroxygen which creates gas pressure in the formation. The formed gas pressure mobilizes, degrades, removes, releases, realigns or redistributes the material causing the blockage or accumulation physically. The aggregate pH of the components is less than about 10 or a concentration of alkali metal chelate is greater than about 0.2% and less than about 5% by weight of non-water components.

18 Claims, 10 Drawing Sheets

COMPOSITIONS AND METHODS FOR ENHANCED HYDROCARBON RECOVERY

BACKGROUND OF THE INVENTION

The recovery or production of hydrocarbons (oil and natural gas) or other fluid resources (e.g., water) to the surface from a hydrocarbon- or water-bearing subterranean formation can be accomplished through a wellbore or drilling of an open hole into the earth to access fluids in such formations. Hydrocarbon bearing formations, and therefore the wellbores, vary in depth below ground surface, and may be less than 100 feet to over 10,000 feet deep. Wellbores may be arranged vertically across the thickness of the formation, or drilled vertically to reach the formation and then extend horizontally within the formation for some distance. In general, the temperature profile of the formation increases with depth. Primary recovery is the phase of oil extraction where no water or gas flooding is needed or used to produce oil from a subterranean formation. Secondary recovery is a recovery improvement process that generally involves water-based flooding or gas flooding. Tertiary recovery, also known as Enhanced Oil Recovery (EOR) represents a variety of technologies used to further oil extraction efficiency from an oil field. EOR has been applied in the oil field as generally only 20% to 40% of oil is recoverable using primary and secondary techniques. Certain heavier and more viscous oils may have no primary recovery phase and only secondary or EOR methods will result in recoverable oil from a formation. EOR methods generally fall into thermal, chemical, or miscible methods. Thermal methods involve large energy inputs using steam, hot liquids, or combustion materials. Chemical methods involve injecting acid, alkali, surfactant, or polymer flooding, and combinations thereof. Miscible methods involve injecting large quantities of hydrocarbons, solvents and gases, such as carbon dioxide, or supercritical fluids. As such, thermal and miscible methods can be costly and only applicable for larger production wells. EOR projects have been conducted in sandstone formations using thermal methods followed by chemical processes. An EOR process used in medium and light oil recovery in sandstone formation is $CO_2$ flooding. EOR in carbonate reservoirs has used miscible gas (e.g., $CO_2$ flooding) with chemical methods with polymer flooding.

SUMMARY OF THE INVENTION

Embodiments of the invention include compositions of and methods of using a fluid formulation for increasing flow, production, and/or recovery of oil and gas hydrocarbons from a wellbore or a portion of a subterranean formation. The composition can include a peroxygen, a surfactant, a alkali metal chelate, and a cosolvent. For example, the peroxygen can be a hydrogen peroxide producing compound or hydrogen peroxide itself. For example, the surfactants can be non-ionic plant based surfactants such as fatty alcohol ethoxylates, fatty acid ethoxylates, fatty acid esters, fatty acid methyl ester ethoxylates, alkyl polyglucosides, polyalcohol ethoxylates, soy alkyltrimethyl ammonium chlorides, or combinations. Examples of solvents are terpenoid- or methyl soyate-ethyl lactate-, methyl lactate- or ethyl acetate-based compounds or combinations. Examples of alkali metal chelates are sodium or potassium chelates. The alkali metal chelate can serve the purpose of scavenging ionic or bound phases of metals in a formation, such as iron, thereby extending the life of the peroxygen and making the peroxygen more stable in the well bore or subterranean formation and increasing the peroxygen penetration in the formation. The surfactants and cosolvents can provide further stabilization of the peroxygens in the well bore and subterranean formation.

Methods of the invention can result in increases in absolute permeability and/or relative permeability of a subterranean formation to oil and/or gas hydrocarbons by denaturing, delaminating, stabilizing, and reducing or preventing swelling, and by removing preferential water and improving oil flow characteristics and re-distributing clays and fines (inorganic and organic) within the subterranean formation. Hydrogen peroxide or a hydrogen peroxide producing liquid phase composition can be applied to all or a portion of a well bore and to a portion of a subterranean formation that upon direct reduction or free radical-based reduction decomposes to produce a gas phase. The pressure of the gas phase in combination with the surfactant and cosolvent provides novel physical and chemical reactions in the well bore and the subterranean formation that increases the recovery of oil and gas hydrocarbons from a subterranean formation. Applications of the compositions and methods embodied in this invention include, but are not limited to: extended duration and controlled oxidant reactions in hydrocarbon-bearing formations; production of in situ generated gas and gas pressure comprised of oxygen, carbon dioxide, or combinations; enhancement of absolute and relative permeability of hydrocarbon-bearing formations; control of clay swelling and minimization of swelled clay impacts in hydrocarbon-bearing formations; increasing or creating secondary permeability in subterranean formations, for example, in shale, carbonate, and mudstone formations; mitigating formation damage and blockage resulting from man-induced activities and treatments in well bores and hydrocarbon bearing subterranean formations; enhancing hydraulic fracturing applications; enhancing explosive or propellant fracturing applications; enhancing resultant hydrocarbon oil and gas recovery through using laterals, horizontal wells, or jetting to introduce a composition to hydrocarbon bearing and non-hydrocarbon subterranean formations; and enhancing hydrocarbon recovery from new or previously applied water flooding operations used to enhanced oil recovery.

A chemical waterflood process that is an embodiment of the instant invention provides increased effectiveness in comparison to other existing waterflood or gas flood secondary or tertiary oil recovery methods. The use of hydrogen peroxide in the chemical-waterflood compositions disclosed in this invention provides advantages over either liquid- or gas-based pressure drive enhancements alone. The decomposition of hydrogen peroxide results in the formation 22.4 L of oxygen gas per mole of liquid hydrogen peroxide added and additionally the production of carbon dioxide gas from the oxidation of organic matter in the formation. There are advantages to providing liquid based amendments to a waterflood that produce gas phases in the formation. The addition of a liquid-based chemical formulation that generates a gas phase in situ, to an oil reservoir or oil bearing subterranean formation within a reservoir, decreases the relative permeability of water in water preferential flow zones and as a result increases the areal and vertical sweep efficiencies in comparison to a waterflood alone, by decreasing preferential and therefore less productive transport during a waterflood. The additional effects of in situ generated gas phase pressure provides an effective gas drive mechanism to enhance oil recovery associated with chemical waterflooding EOR (enhanced oil recovery) activities.

DETAILED DESCRIPTION

Figure 1:
FIG. 1 shows an image from a down hole video of a test well prior to introducing composition and showing significant buildup on casing wall and plugged perforations preventing flow of oil to the well. Circles labeled 1 show blockage and buildup on side of wellbore preventing flow into wellbore.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Subterranean Formation Properties

Hydrocarbon-bearing formations are typically comprised of a combination of unconsolidated or consolidated natural materials such as sand, different types of rock (e.g., sandstones, shales, mudstones, various carbonates), coal-beds, clays, or other materials. Physical and chemical properties of the subterranean hydrocarbon bearing formation matrix vary greatly with respect to the following characteristics and properties, including, but not limited to the following: mineralogy; clay content; natural fracture network, morphology and connectivity; chemistry; temperature; pressure; the presence of one or more fluids (gas or liquids); primary and secondary porosity; the ability of fluids to flow through the pore or fracture space (absolute and relative permeability distributions that affect the recovery of oil and gas hydrocarbons and the ability of hydrocarbons and other fluids to flow through them). It is well known that the presence of clay in a hydrocarbon bearing formation, often referred to as 'shaliness' of the formation, limits the absolute permeability as well as the rate and extent of oil recovery.

The very low natural absolute permeabilities of certain hydrocarbon oil and gas producing rock formations, such as carbonates, shale and coal-bed formations can greatly limit the recovery of hydrocarbons present in the formations. Similarly, many shale formations have extremely low absolute permeabilities, which may be further reduced by the clay content within and between shale and mudstone. The mineral and fluid composition of carbonate and shale formations vary greatly with respect to their geochemical properties and as a result may respond very differently with respect to EOR and gas recovery to different type of chemical treatments, such as acid, alkali, surfactant, polymer, and biological treatments. Chemical methods include alkaline-surfactant-polymer (ASP) flooding, acid, surfactant, proppant, polymer and application methods include waterflooding, finking, jetting, and injection into vertical and horizontal boreholes. Coal-bed formations or seams which may contain large quantities of natural gas or methane, similarly have properties of very low absolute permeabilities making extraction of the gases difficult without significant external man-induced interventions.

Hydrocarbon Properties

Important properties of hydrocarbon fluids, in this case oil, include viscosity, interfacial tension (IFT), and specific gravity. The viscosity, and sometimes specific gravity, of the oil matrix naturally found in a formation may be elevated and resistant to flow and recovery due to inclusion of water, as in a water-bound fraction referred to as a water-in-oil (W/O) emulsion. The viscosity, and sometimes specific gravity, of the oil matrix naturally found in the formation may also be elevated, often referred to as 'heavy oil', and resistant to flow and recovery due to specific hydrocarbon fractions present or absent, and the existence of solids such as clays, fines, biological components, hydrocarbon solids, silicates, minerals, and other soluble and insoluble solids or precipitates.

Formation and hydrocarbon fluid properties, as well as certain interactions between the formation and fluids such as capillary forces, tend to influence the ability of oil and gas to naturally flow through the formation, and therefore greatly influence the rate and extent of hydrocarbon recovery from a wellbore. Frequently, the combination of formation and fluid properties decreases the ability to recover oil from a formation. An example of this is the combination of heavy oil/shaliness/rock with low absolute permeability and low secondary porosity of a formation. Fortunately, as taught in this invention, these same natural formation and hydrocarbon fluid properties can be affected with the disclosed chemical treatment to enhance hydrocarbon oil and gas recovery.

Man-Induced Activities (Better Performing Applications, Damage Issues, Blockages)

In addition to natural formation and hydrocarbon fluid properties that exist in subterranean formations are man-induced activities, such as artificial or man-induced drilling, well construction, formation stimulation, wellbore and matrix treatment, and hydrocarbon production activities. These man-induced activities and the fluids used in these activities introduce changes to the formation that can significantly influence fluid flow properties of the formation and of the hydrocarbons in the formation, affecting the rate and extent of recovery of oil and gas from a wellbore. In some cases, the man-induced activities may temporarily increase hydrocarbon recovery, or yield a certain percentage of the original oil in place hydrocarbon present in a formation. However, in many cases, man-induced activities may not result in substantive yield of the original oil in place hydrocarbon present in a formation. Over time, these artificial or man-induced activities in the wellbore, nearby wellbore, and/or in a hydrocarbon subterranean bearing formation may result in reduced absolute and relative permeabilities and sweep efficiency of oil recovery from a formation which negatively affect the rate and extent of recovery of oil and gas from a wellbore. Inevitably, introduced fluids or changes of formation pressures as a result of drilling, bore hole and well completion, stimulation, fracturing, treating, or production typically results in some level of formation 'damage' or 'blockage' as the fluids intrude the natural formation and have negative interactions in the natural or absolute fluids present in a formation. For example, swelling of certain clays, migration of fines, bacteria growth and subsequent pore or fracture clogging are common problems that are the result of man-induced oil and gas recovery operations. Man made actions such as waterflooding can swell clays and transport swelled clays in a hydrocarbon subterranean formation, decreasing the absolute permeability of a formation and also modifying the relative permeability of a formation to both water- or chemical-flooding operations. The formation of immobile emulsions, gels or polymers, the incomplete recovery of stimulation or fracking liquids, and the formation of larger particle blockages that may include precipitates, flocculants and/or colloids with clays, minerals, paraffins, asphaltenes, and condensates also can lead to clogging and reduction of oil and gas recovery from subterranean formations.

Because hydraulic fracturing results in a significant increase in permeability and because of the nature of the permeability in a formation, a large pressure differential exists at the interface of the fracture face with the formation. This pressure drop at the interface of the fracture and formation, as well as pressure drop at the wellbore resulting from production activities, often causes formation of precipitates, buildup of sludges from hydrocarbon deposits (asphaltenes and/or paraffins), and the gathering of migrating fines and polymers. The resulting damage or blockage is almost always a result of a combination of two or more of these factors.

During the drilling of the vertical boreholes, or horizontally distributed wells or laterals, fluids such as chemicals, polymers, water, acids, and clay-based muds are typically used for various purposes. Post drilling, the wellbore is 'completed' or 'constructed' as either an open hole, meaning without casing and cement across the producing formation, or as a cased well that has pipe casing and cement positioned in the wellbore adjacent to the production zone. Small holes or 'perforations' are shot with a special gun or drilled through the portion of the casing that enables communication with the producing formation. Perforations in the well casing allow the flow of hydrocarbons from the hydrocarbon bearing formation into the wellbore, where it can be brought to the surface by mechanical pumping, air lift, or under natural pressure. Pre-manufactured screened casing, sleeves, or pipe may also be used across the production zone for a similar purpose. Gravel or sand packs may also be introduced around the wellbore to minimize fines and sands from flowing into the wellbore.

Using downhole packers or plugs within a cased well allows for isolation of vertical levels of the production zone, or isolation of the production zone. This isolation can be important in directing various treatment fluids, or for supporting different production schemes.

In the drilling and completion of either cased or open wellbores, various methods, materials, and fluids, often referred to as 'drilling fluids', are used. In addition, foreign fluids, or 'treatment fluids', are also introduced into the formation during well service, well maintenance, workover, or remediation. For example, water and/or chemicals applied during this process are exposed to the formation and can cause clays to swell, precipitates to form as in the case of anhydrites and gypsum, or sludges to develop. This often results in a significant decrease in the relative permeability of the hydrocarbon oil or gas or both, and of the drilling fluids around the wellbore and to some distance into the formation. This can result in significant damage to the well bore and to the formation near the well bore, including a granular filter pack frequently placed outside of the well bore and in between the well bore and the natural formation. Also during drilling, various drilling mud formulations often composed of clay and sometimes polymers build up on the face of the producing formation, or penetrate the formation; therefore, damaging the formation's ability to allow hydrocarbons to flow to the wellbore and decreasing the relative permeabilities of this zone to oil, gas, and/or water. Additional blockages often referred to as filter cake (e.g., polymer containing gels and/or silicate residuals), blocking gels, biological cake, or face plugs can also form during various wellbore procedures. These and other blockages also damage the formation's ability to allow hydrocarbons to flow to the wellbore and decrease relative permeabilities of this zone to oil, gas, and/or water. These damage issues and blockages often concentrate in the perforations, the surface of the wellbore face, and the formation extending somewhat outward from the wellbore, referred to as the 'near-wellbore area'.

Production of Hydrocarbons

The flux of hydrocarbon oils through a formation and into a well bore increases naturally as the distance to a well bore decreases. For example, under radial flow conditions of a fluid to a vertical well bore, the velocity of the fluid increases the closer the fluid is to the well bore. Therefore, the mass flux of hydrocarbon oil through the formation increases as well, the closer a reference point is to the well bore. Similarly, if water is a component of the fluid entering a well, the mass flux of water increases the closer a reference point is to the well bore. Because hydrocarbon oils and formation water contain many materials that upon accumulation can clog pores and fractures in a subterranean formation, clogging of the near wellbore zone is frequently a problem that results in the loss of oil production rates over time. Additionally, man-induced secondary and tertiary EOR methods introduce chemicals and liquids unlike those of the oil and water in and geochemical properties of the subterranean formation as naturally present. The above factors are key in the causes of decreased production of oils over time from a well bore, the near well bore zone, and the subterranean formation. Some examples of well bore and near well bore problems that can reduce oil recovery follow.

Well Bore, Well Casing, Well Perforations, Packing Material, and Pump System Clogging—

Can be caused by solids accumulation in well casings and flowlines associated with asphaltine rich, high molecular weight paraffin, divalent metal cation precipitates, or carbonate rich formations, as well as mud- and clay-sized particles.

Near Well Bore Clogging—

Can be similar to clogging in well bore, but is present in the near field (approximately <1 meter) outside of the well casing. Collection of solids in the pore or fracture space, as well as outside of the casing perforations in the hydrocarbon zone of the formation can decrease oil recovery. Can cause rapid pressure loss in zone immediately outside of the oil well.

There are few publications about treatment of clogged well bores and clogging of a formation near the well bore. U.S. Pat. Nos. 5,374,361, 5,830,831, 4,514,310, 4,668,408, 5,678,631, and 7,296,627 teach methods for well bore cleaning using particular non aqueous phase solvents, and water soluble components Stimulation Activities (Better Performance in and Repairing Existing Damage from Hydraulic Fracturing, Explosion Fracking, Laterals, Matrix Treatments)

Stimulation procedures are often used for the purpose of artificially altering the natural permeability or permeability distributions of a subterranean formation matrix and to improve the relative permeability of oil to flow, as well as to improve the sweep efficiency to provide an improved flow path for hydrocarbons to flow to a vertical or horizontal wellbore. Some commonly practiced procedures include hydraulic 'fracking' (including fracturing with viscous fluids carrying a proppant, and fracturing with no or low concentrations of proppants, referred to as 'slick water fracking', explosive or propellant fracking, drilling or jetting of radials or laterals out from the wellbore, and matrix treatments. These procedures create fractures, connect natural fractures, or create channels in the hydrocarbon-bearing formation that results in increased flow paths to the wellbore, and as a stimulation to increase the rate and duration of hydrocarbon recovery. These procedures are also employed to remove or circumvent blockages and damage to the permeability of a formation that may exist outside the wellbore or in the formation, and also to provide formation access for injection of treatment fluids. Inevitably, artificial fracturing also typically results in some level of formation damage and blockage as the fracturing fluids intrude the natural formation and have negative interactions in the way of swelling certain clays, migration of fines, bacteria growth, formation of immobile emulsions or gels, and formation of larger particle blockages that may include precipitates, flocculants and/or colloids with clays, minerals, paraffins, asphaltenes, condensates and polymers. Also, since the fracturing results in significant increase in permeability and permeability contrasts in a formation, a large pressure differential exists at the fracture face. This pressure drop at the interface of the fracture and formation often is a catalyst for the formation of precipitates, buildup of sludges from hydrocarbon deposits (asphaltenes and/or paraffins), and the gathering of migrating fines. The resulting damage or blockage is almost always a result of a combination of two or more of these interactions.

A significant issue with fracturing is the ability to control where the induced fracturing goes, especially in the case of hydraulic fracturing, and to make sure it does not leave the target hydrocarbon-bearing formation to enter a non-productive zone, or even a water-saturated zone. Either of these two complications can result in the wellbore not being economically productive, and can lead to field wide negative consequences.

Hydraulic Fracking

Hydraulic fracking typically refers to the injection or pumping at a rate and under sufficient pressure (pressure above the formation fracture pressure) of foamed gases, fluids, water, hydrocarbons, chemicals, or viscous fluids with the addition of solids referred to as 'proppants', through the vertical or horizontal wellbore into an oil and/or gas hydrocarbon-bearing formation matrix for the purpose of increasing the hydraulic flow properties of the formation matrix. When the fluid is injected into the formation at such a flow rate and under sufficiently high pressure as to lift the formation, extend natural fractures, or crack the formation rock or matrix, this procedure is referred to as 'hydraulic fracturing' or 'fracking'. Large volumes of fluids are typically used in fracking, and often expose the formation to various mixtures of water, proppant, viscous fluids, viscous fluid breakers ('breakers'), diesel, kerosene and other hydrocarbon distillates, enzymes, and various chemicals including acids, acid blends and acid retardants, polymers, biocides, solvents, oxidants, and surfactants. Proppants include sand and man-made materials (beads, ceramics, etc.) that serve to prop open the fractured formation face as it is squeezed by natural formation pressures, and keep the created fractures sufficiently open to support increased fluid flow to the wellbore. Inevitably, hydraulic fracturing also typically results in some level of formation damage and blockage as the fracturing fluids intrude the natural formation and have negative interactions in the way of swelling certain clays, migrating fines, introducing microbial growth and biofouling, forming immobile emulsions or gels, and forming larger particle blockages that may include precipitates, flocculants and/or colloids with clays, minerals, paraffins, asphaltenes, and/or condensates. Also, since the fracturing results in significant increase in permeability, a large pressure differential exists at the fracture face. This pressure drop at the interface of the fracture and formation often causes the formation of precipitates, buildup or accumulation of sludges from hydrocarbon deposits (asphaltenes and/or paraffins), and the gathering of migrating fines. The resulting damage or blockage is almost always a result of a combination of two or more of these interactions.

As previously noted, a large concern for hydraulic fracturing is the ability to control where the induced fracturing goes, and to ensure it remains in the targeted production zone. Hydraulic fracturing that leaves the production zone may leave the wellbore economically unproductive, and can lead to field wide negative consequences if the fracture enters a highly water saturated zone.

Explosive or Propellant Fracking, Shock Wave Stimulation

Explosive or propellant fracturing, shock wave, seismic, or other high energy or percussion fracturing or stimulation consists of placing into the wellbore, or in radials or laterals extending from the vertical or horizontal wellbore, a high energy source of propellants, explosives, stem explosive charges, low-detonation-velocity explosives, high impulse source, frac sticks, reactive chemicals, sources of high energy sound, pressure, shock wave, seismic, or vibratory waves, or other energy waves that once ignited, detonated, burned or initiated will generate a high energy profile of gas pressure, fluid displacement wave, or shock wave extending out from the wellbore and can create or extend multiple fractures and cracks into the hydrocarbon-bearing formation, or even result in the formation matrix to become rubble. Proppant is generally not used since the created rubble inserts into the fractures or cracks preventing them from closing back up following the fracture opening. The propellants or explosives can be in solid, liquid, or gel form. Most procedures claim to create multiple radial fractures extending 5 feet to 60 feet from the wellbore. This mechanical stimulation results in increased formation permeability and flow paths or fractures to the wellbore, and is applied to various formation matrix materials including rock, sandstone, carbonates, shales, mudstones, and other formations. These procedures are also employed to remove or circumvent wellbore and formation skin damage caused by drilling, completion, acids, mud cake, scale, fines buildup, and paraffin. Another application of this procedure is to mechanically prepare or 'break down' the formation matrix in preparation for hydraulic fracturing techniques, and also to provide formation access for injection of treatment fluids or fracturing fluids.

Common examples of propellant or explosive fracking include the placement in the wellbore of propellants or explosives which are progressively burned, detonated, or ignited to generate one or multiple high pressure gases or shock waves at a rate that creates fracturing of the formation surrounding the wellbore. Fluids, often including water, water based chemicals, and liquid explosives, and acids, acid blends, and acid retardants are typically used in conjunction with or following the high energy, propellant, or percussion fracturing procedure to etch, extend, or clean the newly created fractures. More recent efforts have focused on the development of explosive- and propellant-based techniques designed to directly displace a liquid explosive into a hydraulic fracture system before detonation, the development of a low-detonation-velocity explosive that would be placed directly across the hydrocarbon bearing zone(s), and a technique wherein the primary explosive charge would be placed below the hydrocarbon bearing to be fractured with the detonation gases providing the fracturing energy (Sandia National Laboratories).

Drilled or Jetted Laterals

The drilling or jetting of lateral holes or monobore openings ('laterals') from the wellbore into the hydrocarbon-bearing formation is another common example of mechanical procedures used to provide access to the formation, and increase rate and extent of hydrocarbon recovery. The drilling or jetting of laterals, often arranged radially from a wellbore, consists of creating microbores, monobores, holes, channels, or openings that are drilled or 'jetted' approximately horizontally from the new or old wellbore, or angled from the wellbore, in a radial pattern out some distance into the formation. The jetting of radial laterals or openings into the formation is typically completed using fluids or fluids in combination with abrasive solids that are exerted through a nozzle at the end of a pipe or hose under high pressure to cut or remove formation materials and create a lateral or monobore opening of less than 1 inch in approximate diameter to greater than several inches approximate diameter, and often extending 1 foot to over 1,000 feet out from the wellbore. Laterals extending 5 feet to over 300 feet out from the wellbore are common. Layers of radials or laterals can be stacked or positioned vertically (one or more radial or lateral extending out from the wellbore at multiple depths or zones) across the production zone.

In the drilling or jetting of radials or laterals, fluids often used include water or water combined with surfactants, solvents, foams, gases, other chemicals, acids, acid blends, and acid retardants. The radials or laterals are also used to give formation access and deeper reservoir penetration to specialty or stimulation fluids by pumping or displacing these fluids into the laterals, including fluids such as surfactants, solvents, microbial products, chemicals, and acids. This mechanical stimulation results in increased formation permeability and flow paths to the wellbore, and is applied to various formation matrix materials including rock, sandstone, carbonates, dolomite, shales, mudstones, and other types of formations. These procedures are also employed to remove or circumvent wellbore and formation skin damage caused by drilling, completion, acids, mud cake, scale, fines buildup, and paraffin. Another application of this procedure is to mechanically prepare or 'break down' the formation matrix in preparation for hydraulic fracturing techniques, and also to provide formation access for injection of treatment fluids, stimulation fluids, fracturing fluids, and/or fracturing propellants and explosives.

A significant limitation to the effectiveness of stimulations utilizing radial or lateral monobores to sustain increased flow of hydrocarbons is the damage to the formation caused by the drilling or jetting of the laterals, essentially closing themselves off to flow. Another significant limitation to drilling or jetting laterals in unconsolidated and/or slightly consolidated formations is that the formation walls of the lateral are unstable and collapse during or shortly following the procedure, closing off the lateral to flow of hydrocarbons. Inevitably, fluids used in the drilling or jetting of laterals typically result in some level of formation damage and blockage as the fluids intrude the natural formation around the freshly cut lateral opening and have negative interactions in the way of swelling sensitive clays, migrating fines, introducing bacteria growth, forming immobile emulsions or gels, and forming larger particle blockages that may include precipitates, flocculants, and/or colloids with clays, minerals, paraffins, asphaltenes, and condensates. Since the fracturing results in significant increase in permeability relative to the surrounding formation matrix, a large pressure differential exists at the wall and inside of the lateral opening or monobore. This pressure drop at the interface of the lateral opening and formation may cause formation of precipitates, buildup of sludges from hydrocarbon deposits (asphaltenes and/or paraffins), and the gathering of migrating fines. Also, the process of drilling or jetting the lateral openings generates what are effectively cuttings and fines of the formation matrix being removed. These materials also may serve to block or sludge up the lateral openings, effectively reducing permeability and flow of hydrocarbons back to the wellbore.

Seismic and Vibratory Stimulation

Seismic stimulation, including surface or in situ seismic stimulation, seismic stimulation conducted at or near the level of the hydrocarbon producing formation, or other methods or equipment that generate elastic shock waves, enhances hydrocarbon production by sending seismic waves across a hydrocarbon-bearing formation, similar in concept to seismic waves generated naturally by an earthquake, or vibratory forces generated mechanically by trains or other large equipment. The force perturbation resulting from the seismic waves have been found to increase hydrocarbon production through various mechanisms, all of which are not yet fully understood. The needed force that a seismic wave provides to the background fluid pressure gradient is described as poroelasticity theory.

The first seismic stimulation experiments to increase oil production were conducted in Russia. Interest in seismic stimulation has grown and several major oil companies, the Los Alamos National Laboratory, and the Petroleum Technology Transfer Counsel (PTTC) of the Department of Energy (DOE) have conducted test projects, and concluded in situ seismic stimulation, at the level of the producing formation, appears to be much more effective than surface stimulation. (Oil & Gas Docket No. 8A-0240292)

For example, in pilot seismic stimulation projects conducted by a major oil company, wells were equipped with in situ seismic tools at producing depth in order to generate high energy, low frequency, elastic shock waves every 10 seconds traveling 1½ miles per second. Pump jacks on the surface provide the energy. The tool at the base of the rod string contains upper and lower barrels and plungers, with a compression chamber between. At the bottom of the pump stroke, water is drawn into the tool, and then compressed between the plungers during the upstroke. At the top of the stroke, the lower plunger leaves the barrel and the compressed water is discharged, creating shock waves which carry a megawatt of energy at 3500 psi. (Oil & Gas Docket No. 8A-0240292)

Water, gas, and stimulation fluids, such as surfactants, acids, acid blends, acid retardants, solvents, and other chemicals may be used in conjunction with seismic and vibratory stimulation.

Stimulation—Matrix Treatments, Acidizing, Oxidants, Surfactants

Matrix stimulation treatments, also referred to as 'well treatments', generally include the pumping or injection of fluids, acids, acid blends and acid retardants, heat, steam, gases, water, foams, surfactants, solvents, and other chemicals into the wellbore, formation area around the near-wellbore, and the hydrocarbon-bearing formation matrix. Matrix treatments are typically designed to change formation and/or hydrocarbon characteristics to increase flow properties, or to remediate damage to the formation. Matrix treatments are generally differentiated from hydraulic fracturing because the procedure is applied or performed at pressures below the formation fracturing pressure, but in some cases, the treatment injection pressure may from time to time be at or above reservoir fracturing pressures.

Acid Treatments

Matrix stimulation treatments using acids, or acids in combination with water, surfactants, or other chemicals, are very common and also referred to as 'acid treatments' or 'acidizing'. Hydrochloric acid (HCl), acetic acid, citric, formic and hydrofluoric acid are commonly used acids for matrix treatment. Acid treatments can include using acids to react with formation materials, such as acid soluble rock material in the formation matrix, to aid in increasing permeability. Acids treatments are also commonly used to clean cement perforations, etch formation face, and to clean drilling muds from the formation face. Important limitations in the use of acids in hydrocarbon-bearing formations is that acids generally exhibit very rapid and aggressive reactions with minerals present in high concentrations in carbonate formations, such as calcite, and other materials common to many formations. This results in the acid becoming 'spent' quickly, and limiting the effectiveness of the treatment mostly to the exposed surface of the formation fracture or face without penetrating any substantial distance into the reservoir. Studies on the effects of the use of acids or acid blends to enhance hydrocarbon recovery have found that the use of these fluids actually can result in formation damage and blockages such as sludge (e.g., acid and ferric iron-induced asphaltic sludge), liberation of fines and precipitate formation, and emulsion blocks from spent acid viscous emulsions (Society of Petroleum Engineering Presentation, BJ Services). The spent acid fluids also need to be recovered separately into a pit or tank and disposed of as wastes, as opposed to simply being routed to the production tank or re-used. One characteristic of acid treatments in carbonate formations is that acids are generally neutralized over time and may result in precipitation of acid solubilized cations, such as $Ca^{2+}$ and $Mg^{2+}$ resulting in formation clogging. Similarly, at the boundaries of where acid treatments contact formation materials, precipitation of acid solubilized cations will take place resulting in precipitation reactions and subsequent formation clogging. Reactions of shales with acids is variable, dependent on the mineral and organic composition of the oil shale. For example, kerogen, a common organic phase in oil shale, is not appreciably soluble in acids or alkalis. The mineral composition of oil shale is variable with the principal components consisting of quartz, calcareous phases of calcium and dolomitic limestone, feldspars, silicates, clays, and pyrite. Reactions of strong mineral acids with shales may result in the loss of structural strength because of disaggregation of the matrix, particularly with calcium and dolomitic limestone components of the shale. Some success in the recovery of kerogen from shale has been reported using phenol-toluene sulfonic acid treatments. Typically, acid treatment of shale for gas recovery has not been successful.

U.S. Pat. No. 6,593,279 teaches a composition for cleaning oil sludges from oil well cuttings, well formations, and down hole wells comprised of a mixture of water, an acid blend (with at least one mineral and one organic acid), a non-ionic surfactant, an anionic surfactant, and a solvent, where additionally an oxidizer consisting of a permanganate compound may be added.

In an embodiment of the present invention, no permanganate is used. Permanganate is not a gas forming oxidant and does not generate a gas phase or gas phase pressure upon direct reduction decomposition. Further, permanganate is reduced to manganese dioxide precipitates which readily clog pore and fracture space, resulting in low absolute permeability of a formation which will decrease hydrocarbon oil and gas recovery in a well.

Use of Oxidants

Peroxygens and permanganate oxidants can be used as components of various fluids applied to well bores and subterranean formations to enhance hydrocarbon oil and gas recovery.

U.S. Pat. No. 4,464,268 (Schievelbein) relates to injecting into a subterranean oil containing formation a water or brine mixture, using e.g. hydrogen peroxide with acid, followed by backflowing or displacing with a water or brine mixture containing about 0.5% to 3.0% sodium bisulfate as a reducing agent, and ethoxylated nonylphenol.

An embodiment of the present invention does not teach or claim the use of ethoxylated nonyl phenol surfactants. In an embodiment of the present invention, acid is not used, with the exception of less than 1% acid when a polymer or biological type blockage exists in a well bore or in the near well bore. Oxidant reducing agents are not used in an embodiment of the present invention; oxidant stabilizing agents are used to extend the period of time a peroxygen, such as hydrogen peroxide, is present in the well bore or subterranean formation. In an embodiment of the present invention the oxidant in the well bore and in the subterranean formation has and is intended to have a long lifetime. The use of sodium bisulfate would rapidly accelerate the decomposition of hydrogen peroxide, defeating the further activity of the hydrogen peroxide in the formation.

U.S. Pat. No. 4,867,238 (Bayless) relates to recovery of viscous hydrocarbons and hydrocarbons in geologic formations and stimulating oil wells by decomposing hydrogen peroxide near resident hydrocarbons at sufficient quantities to generate heat, water, and oxygen sufficient to move the decomposition and reaction outwardly from the injection location along a pressure/steam/combustion front in the subsurface. The injection of hydrogen peroxide from 10% to 90% is taught. Large quantities of hydrogen peroxide are required, so that a hydrogen peroxide production facility would be required to be constructed near a well field to be treated. U.S.

In an embodiment of the present invention, large quantities of hydrogen peroxide are not used or needed and would not be desirable. Hydrogen peroxide is not used at such high concentrations that a combustion front is formed. Hydrogen peroxide is not used alone. High concentrations of hydrogen peroxide in the 10% to 90% range are not used.

In U.S. Pat. Nos. 7,923,417 and 7,928,040 Sanders et al. teach a fracking fluid and method of treating a well bore or a portion of an adjacent subterranean formation following the steps of introducing a composition including water, a source of hydrogen peroxide, and an activator consisting of an alkanoyl-donor compound with pH adjustment A water soluble alkanoyl-donor compound has a leaving group in the pKa range of about 6 to 13, with pH adjusted to the range of 3 to 8, or 3 to 10.

In an embodiment of the present invention no alkanoyl-donor compound peroxide activator is taught or claimed for use in the invention. Non-ionic surfactants can delay the activation of the peroxygen by stabilization, which extends the duration of effective oxidation of the peroxygen and additionally displaces bound and trapped oil in the well bore, the adjacent filter cake, and in the adjacent subterranean formation, for the effective treatment of well bores, adjacent filter cake, and stranded polymer in adjacent subterranean formations. Over time stranded polymer in the well bore, filter cake, and in adjacent subterranean formations can form matrices that block oil flow to and in a well including polymers, oil, asphaltenes, paraffins, clays, inorganic precipitates, and biological cells and biofilms. These are more effectively treated when a non-ionic surfactant is present in the composition.

U.S. Pat. No. 4,572,292 (Stapp) relates to injecting an inorganic peroxide in the concentration range of 0.01% to 10% with at least one fatty amine oxide in the concentration range of 0.01% to 10% and thereafter injecting into a formation an aqueous drive fluid and producing oil from a formation through extraction in a production well. Amine oxides are oxides of tertiary amines and behave as either nonionic or cationic surfactants dependent on the particular amine oxide and degree of protonation (i.e., the pH of the system that the amine oxide is in).

In an embodiment of the present invention, no amine oxide surfactants are used.

U.S. Pat. No. 6,972,274 B1 (Slikta) teaches restoring the permeability of a porous underground petroleum containing formation using a combination of at least one non-ionic compound (preferably an ethoxylated alcohol) with at least one cationic compound (preferably a quaternary ammonium compound).

US Patent No. 2009/0313772 A1 teaches a method and composition for contacting a liquid additive composition with a hydrocarbon-containing materials comprising a peroxygen compound, a surfactant and at least 20 wt. % alkalis.

The addition of high concentrations of alkalis rapidly causes the reduction of hydrogen peroxide and hydrogen peroxide forming chemicals, decreasing the duration of time that the peroxygen is active. In an embodiment of the present invention no high concentration of 20% or greater alkali is added.

Clay Stabilization

U.S. Patent Application US2005/0215439 A1, Blair, describes cationic polymer clay stabilization in a subsurface formation with poly(dimethylaminoethylmethacrylate quaternary salt, poly(dimethylaminoethylacrylate quaternary salt and dimethylaminoethylmethacrylate-dimethylaminoethylacrylate quaternary salt copolymer, with polymer molecular weights of about 1,000 to about 100,000.

U.S. Patent Application US2011/0180255, Rousseau et al., describes injection of aqueous polymer solutions into a reservoir rock, with a two stage process, injecting first an aqueous solution of non-associative hydrophilic polymers so they adsorb on the reservoir rock, and second injecting an aqueous solution of an associative polymer with limited adsorption because of the prior injected non-associative polymers of the first solution. The non-associative polymers of the first layer have molecular weights in the $20 \times 10^3$ to $40 \times 10^6$ range and the associative polymers of the second layer in the $20 \times 10^3$ to $20 \times 10^6$ range.

U.S. Pat. No. 7,284,610B2, Poelker et al., presents a method of stabilizing a clay containing formation in rock surrounding a well bore that may be encountered during hydrocarbon recovery operations with a polyamine salt of an imide of a polymer of maleic anhydride from a group consisting of homopolymers of maleic anhydride containing repeating units at least about 90 percent of which are maleic anhydride.

U.S. Pat. No. 4,447,342, Borchardt et al., presents a method of preventing the swelling damage due to clay swelling, disintegration and migration in subterranean formations producing oil and gas where enhanced oil recovery techniques would use anionic or caustic flood chemicals, by first introducing a cationic organic polymer with a carrier fluid into the reservoir treatment area, then introducing an effective amount of non-ionic aqueous solution being inert to the clay stabilizer to cause the polymer to reorient itself on the clay so that the polymer continues to stabilize the clay, then introducing anionic and caustic flood chemicals.

In an embodiment of the instant invention, no polymers reduce swelling damage due to expanded or potentially expanded clays to subterranean formations for oil or gas recovery. In an embodiment of the instant invention, no polymers are added to prevent the subsequent adsorption or absorption of cationic surfactants.

Injection Stimulation—Thermal, Pulse, Steam (SAGD), Gas, Multiphase (Gas and Liquid), Water and Gas (WAG), Flooding (Chemical, Water, Gas, Steam)

Injection and flood stimulations include various procedures, and often specialized equipment, for pumping or injecting fluids or gases, typically aqueous based fluids, that contain acids, heat, steam, gases, water, foams, surfactants, solvents, and other chemicals into a producing wellbore, or wellbore designated as an injection wellbore (often referred to as 'injector wells'), and into the hydrocarbon-bearing formation for the purpose of enhancing the flow properties of the formation and/or hydrocarbons present. These techniques are implemented to mobilize heavy oil, commonly considered as oil lower than 25 degrees API, or as basic secondary recovery measures where natural formation pressures have been depleted. For secondary recovery, fluids or gases are injected to increase fluid or hydrostatic pressures in the formation (referred to as 'water drive' or 'fluid drive') and/or formation gas pressures (referred to as 'gas drive'), resulting in hydrocarbons being displaced towards the production wellbores. Injection and flood stimulations are generally differentiated from matrix treatments in that larger quantities of fluids are injected over longer periods of time (fluids are injected as a part of ongoing production operations as opposed to a short term treatment event). Also the fluids or gases are injected at an injector wellbore to influence production or recovery at other production wellbores located at some distance vertically or horizontally from the injector well.

The amount or percentage original oil in place that is contacted or displaced by flooding or injected fluids is referred to as 'sweep efficiency'.

The chemical waterflood process of an embodiment of the instant invention provides increased effectiveness in comparison to other existing waterflood or gas flood secondary oil recovery methods. The use of hydrogen peroxide in the chemical-waterflood compositions provides advantages over either liquid- or gas-based pressure drive enhancements alone. The decomposition of hydrogen peroxide results in the formation 22.4 L of oxygen gas per mole of liquid hydrogen peroxide added and additionally the production of carbon dioxide gas from the oxidation of organic matter in the formation. There are advantages to providing liquid based amendments to a waterflood that produces gas phases in the formation. The addition of a liquid-based chemical formulation that generates a gas phase in situ, to an oil reservoir or oil formation within a reservoir, decreases the relative permeability of water in water preferential flow zones and as a result increases the areal and vertical sweep efficiencies in comparison to a waterflood alone, by decreasing preferential transport during a waterflood.

Chemical-based EOR methods include the use of alkali chemicals, surfactants, and polymers, and combinations thereof. Increasing oil mobility control is a major goal of chemical-based EOR processes and is based on creating a mobility ratio that is favorable for oil mobilization while simultaneously maintaining effective sweep efficiency in a formation for maximum oil recovery. A chemical-based flood utilizing surfactants includes alkaline, surfactants, and polymers, known as ASP. A key objective in the traditional use of surfactants in EOR has been to crate ultralow interfacial tensions (IFT) between the oil phase and the displacing phase. The goal of the traditional use of surfactants in EOR is to increase the capillary number (i.e., the ratio of viscous to local capillary forces) and has been shown by Lake (1989) to decrease oil residual saturation in formations.

However, because anionic surfactants are commonly used, sorption of the surfactant onto the formation matrix can be significant. Levitt (2009) reports surfactant sorption of high performance surfactant-polymer waterflood EOR anionic surfactants with cosurfactants at 0.08 mg/g for Berea Sandstone and 0.24 mg/g dolomite reservoir rock. The Berea Sandstone laboratory experiments considered of a 0.5 pore volume surfactant-polymer slug comprised of 1% anionic surfactants with 2% sec-butyl alcohol (SBA) cosolvent and a 0.20% polymer followed by a 2 pore volume polymer drive. The dolomite reservoir rock laboratory experiments considered a 0.5 pore volume surfactant-polymer slug comprised of 1% anionic surfactants with 2% Sec-butyl alcohol cosolvent and a 0.25% polymer followed by a 2 pore volume polymer drive. It was reported that the presence of anhydrite in the West Texas Dolomite reservoir precluded the use of sodium carbonate. The authors indicate that in the absence of anhydrite sodium carbonate could be used and may eliminate the need for SBA and also lead to lower surfactant sorption in the matrix. While the unit rate of surfactant sorption appears to be low in these experiments, the actual amount of surfactant sorption in a large reservoir will be very high.

The aqueous solubility of anionic surfactants is sensitive to formation water brine concentrations, with decreasing aqueous surfactant concentrations solubilized as the brine concentration in the formation water increases. The phase behavior of oil-water emulsions is affected by brine concentrations. Pope (1979) determined that the controlling salinity was most important factor to control to enhance oil recovery in laboratory experiments when using surfactants sensitive to brine concentrations, Healy (1976), using pipette reactors, demonstrated the effects of varying brine concentration on the phase behavior of oil-water-surfactant systems. Prior to chemical floods with surfactants a pre-flush with low brine concentration water can lower the brine concentration in the formation for optimal surfactant-based recovery of oil. A factor affecting traditional ASP EOR processes is that many divalent metal cations present in the formation may solubilize and those present in the brine may precipitate out of solution into a solid phase because of the alkaline conditions which can clog formations and reduce oil yields.

U.S. Pat. No. 7,585,817 B2 teaches a solvent composition comprising nonionic fluorinated polymeric surfactants (comprising at least one of a polyol or a polyol ether and at least one monohydroxy alcohol, ether, or ketone) wherein the solvent is capable of at least one of solubilizing or displacing brine or condensate in the hydrocarbon bearing elastic formations for recovery of hydrocarbons. No peroxygens are taught or claimed in U.S. Pat. No. 7,585,817 B2.

U.S. Pat. No. 5,247,995, Tjon-Jow-Pin et al., presents methods for increasing the flow of production fluids from subterranean formations from well bores and subterranean formations surrounding the well bore removing polysaccharide-containing filter cakes by blending and pumping into the well bore an aqueous fluid and enzymes.

During waterflooding biological growth associated with iron and sulfate reducing bacteria may occur, resulting in a decrease in the absolute permeability of the formation. Additionally, clay swelling can result in clogging of the matrix.

The largest market for Enhanced Oil Recovery (EOR) processes has been to treat large production wells that have experienced diminishing returns with primary recovery methods. $CO_2$ flooding has been practiced since the 1970's and has been one of the most common EOR methods. $CO_2$ flooding has practical operation limitations where it is applicable. For example, $CO_2$ flooding may be limited to enhancing production of light, medium, and/or heavy crude oils, minimum temperature and pressure conditions where $CO_2$ is miscible with oil, and availability (cost) of $CO_2$ in frequently remote locations. It takes about 6 to 15 Million Cubic Feet (MCF) of CO2 to produce a barrel of oil, so that there are practical scale limitations to projects where $CO_2$ flooding is cost effective.

Water flooding is a frequently used secondary oil recovery method to increase the pressure gradient in a formation and to drive oil to recovery wells for increased production. Common water flooding methods use vertical injection wells, in which formation or locally available water is injected under pressure to drive oil to vertical oil recovery wells. Water flooding is also conducted in horizontal-based injection and recovery systems. In addition to water flooding, immiscible gas flooding has been used as a secondary oil recovery method. As a water injection process proceeds during a waterflood event, the mobility of the oil can increase in the pore space of a rock or porous media matrix. If effective areal sweep and vertical sweep efficiencies exist with a waterflood, then ideally a water bank is established in the vicinity of the injection well and an oil bank is created, resulting in pushing the oil bank to the extraction well. Once the oil bank is depleted by extraction then the water bank reaches the extraction well decreasing the effectiveness of the waterflood beyond this point.

Increased pressure gradient and pore volume fractions from either water, gas, or both water and gas affects the mobility of the oil in a given pore space.

In a water and oil filled pore space, the mobility of oil is related to the viscosity of the oil and the relative permeability of the matrix to oil. The mobility of oil and water in such a system are defined in the following two equations:

$$\lambda_o = \frac{k_o}{\mu_o} = \frac{kk_{ro}}{\mu_o}$$

$$\lambda_w = \frac{k_w}{\mu_w} = \frac{kk_{rw}}{\mu_w}$$

where $\lambda_o$, $\lambda_w$=mobility of oil and water, respectively
$k_o$, $k_w$=effective permeability to oil and water, respectively
$k_{ro}$, $k_{rw}$=relative permeability to oil, water, respectively
k=absolute permeability
$\mu_o$, $\mu_w$=viscosity of oil and water, respectively Additionally, when a gas phase is also present in the pore space the mobility of gas is described as follows:

$$\lambda_g = \frac{k_g}{\mu_g} = \frac{kk_{rg}}{\mu_g}$$

where, $\lambda_g$=mobility of gas
$k_g$=effective permeability to gas
$k_{rg}$=relative permeability to gas
k=absolute permeability
$\mu_g$=viscosity of gas The mobility ratio of oil in a water flood application can be defined as:

$$M = \lambda_{displacing}/\lambda_{displaced}$$

For waterflooding, this equation can be defined as:

$$M = \lambda_w/\lambda_o$$

Also for gas and water flooding, the mobility ratio can be defined as:

$$M = (\lambda_w + \lambda_o)/\lambda_o$$

Therefore, the mobility ratio is a function of the relative permeability and viscosity of each fluid in the pore space, as well as the absolute permeability of the formation.

The respective volumetric fractions of oil, water, and gas in a matrix will equal the total porosity of the matrix, as follows:

$$\theta_T = \theta_o + \theta_w + \theta_g$$

where,
$\theta_T$=total porosity,
$\theta_o$=fraction of total porosity filled by oil,
$\theta_w$=fraction of total porosity filled by water,
$\theta_g$=fraction of total porosity filled by gas.

The relative permeability of a fluid in a matrix is a function of the volumetric fraction of the total porosity of that fluid and the absolute permeability of the matrix. As the volumetric fraction of a fluid increases, therefore so does the relative permeability of the fluid.

The above relationships describe partial fluid saturation, fluid viscosities, and matrix properties in ideal one-dimensional flow regimes. Because a one-dimensional flow regime in oil reservoirs rarely exists and is greatly affected by oil recovery operations, heterogeneous distributions of fluid saturations, fluid viscosities, and matrix properties exist in most reservoirs in space and over time during oil extraction activities. For example, in oil and water saturated reservoirs with water drive as the primary extraction mechanism, depletions of the oil-filled porosity in various locations in the reservoir, the result of heterogeneous distributions of absolute permeability, as well as initial oil-filled porosity distributions, result in decreased areal and vertical sweep efficiencies over time and can lead to poor incremental recoveries associated with water flooding operations. This is created by resultant preferential waterflooding flow regimes in the formation. [As a result sweep efficiencies of the waterflood are marginal. As a result of water flooding operations, zones with higher relative permeability to water become even more water saturated and the relative permeability to water increases further, creating preferential water-flow channels in the formation, creating short circuiting of a waterflood between injector and recovery wells, greatly decreasing the effectiveness of the waterflood. During waterflooding biological growth associated with iron and sulfate reducing bacteria may occur, resulting in a decrease in the absolute permeability of the formation. Clay swelling can result in clogging of the matrix porosity and decrease of the total fluid porosity of a matrix, decreasing the absolute porosity of the matrix. As a result, during waterflood events, the well head pressure required to continue a steady flow rate of injected water can increase dramatically over time to pressures either not economical to maintain or damaging to the formation. In some cases, increases in well head injected water pressure cause decreases in areal and vertical sweep efficiencies and overall volumetric flow rates injected into a formation. Injection well screens or casing perforations, as well as the near field surrounding injection wells, may clog with inorganic and organic residue, including swelled clays, asphaltenes, paraffins, biological materials, and metal precipitates. The impacts of clogged injection wells and the near field outside the injection well in the formation can significantly increase the pressure required to inject water and decrease the water flow rate possible to inject through the well. These negative impacts on water flooding decrease the overall effectiveness of water flooding operations and decrease the injectability of water flood chemical treatments.

In many formations, gas or water pressure released during an initial depressurization phase associated with primary oil recovery results in a loss off of a pressure gradient needed to drive oil to a well. The problem is exacerbated in formations where the oil is of a higher API gravity, in the 10° to 22° heavy oil range. In formations with higher gravity oil, the mobility ratio is frequently unfavorable for transport of the oil in the formation to recovery wells in the primary recovery phase and requires either secondary or tertiary recovery methods to extract oil. This decrease in an effective drive mechanism for primary oil recovery in a formation results in the loss of oil production in wells and leads to the need for further man-induced interventions in order to extract additional oil still remaining in the formation.

With regard to SAGD, other wellbore configurations include placement of an injection wellbore offset some distance from the producing wellbores, and used to insert water, chemicals, or gas into the producing formation to push the hydrocarbons across the formation and to a producing well for recovery. Similarly, horizontal wellbores may be stacked within the producing formation.

With regard to steam Injection a limitation is the required infrastructure and economic costs of equipment and operation. A limitation can be steam condensate reaction with sensitive clays.

Thermal and Hydraulic Pulse Injection is another method.

Embodiments of the present invention pertain to compositions and methods for increasing the rate and extent of hydrocarbon recovery from hydrocarbon-bearing formations, even at low formation temperatures below 100 degrees F. (38 degrees C.), utilizing a water-based treatment system. The composition and methods can be used in naturally occurring hydrocarbon formations that have not experienced prior secondary or tertiary EOR chemical or physical treatment. The compositions of embodiments according to the present invention include fluids used during man-induced activities placing these fluids into the hydrocarbon bearing formation, such as drilling fluids, completion fluids, workover or remediation fluids, treatment fluids, stimulation fluids, and fracturing fluids. The compositions can be the only fluids used or can be components of other fluids used for various well installation techniques, drilled or jetted laterals, explosive or propellant fracking, shock wave, seismic, or vibratory stimulation methods, or other types of physical hydrocarbon oil and gas stimulation or application methods.

The compositions and methods according to an embodiment of the present invention can be applied to, for example, the treatment of clogged well bores, well bore perforations, filter screens, emplaced granular materials outside of the well bore adjacent to the subterranean formation, and the near well bore zone in the adjacent subterranean formation. Additionally, the composition and methods of application include the use for chemical waterflooding and proppant-free or slick-water fracking.

Combined and synergistic elements of a composition according to an embodiment of the present invention affect three features important to improved oil recovery: the oil matrix and the relative permeability of the oil in the formation; blockages; and formation absolute permeability. Factors affecting concentrations of the components of the composition to be applied include the magnitude or extent of the deposits or blockages to be removed, and the composition of the deposits (e.g., hydrocarbon based deposits such as asphaltenes and paraffin, shale or clay, inorganic precipitates, and bioslime or biological based blockages) or blockages. For example, deposits only on the surface of the casing, perforations, or pump assembly would be expected to require a lower concentration compared with deposits or blockages in the perforations or extending out into the well near field that have completely restricted flow of fluids or gases.

In an embodiment according to the present invention, hydrogen peroxide or a hydrogen peroxide producing liquid phase composition is applied to all or a portion of a well bore and/or to a portion of a subterranean formation that upon direct reduction or free radical-based reduction decomposes to produce a gas phase and gas phase pressure, which, in combination with the surfactant, an alkali chelate, e.g., a sodium or potassium chelate, and a cosolvent provides novel physical and chemical reactions in the well bore and the subterranean formation that increases the recovery of oil and gas hydrocarbons from a subterranean formation. Specific applications that the compositions and methods according to embodiments of the present invention include, but are not limited to are as follows: extended duration and controlled oxidant reaction in hydrocarbon-bearing formations; production of in situ generated gas and gas pressure comprised of oxygen and/or carbon dioxide and combinations; enhanced absolute and relative permeability of hydrocarbon-bearing formations; control of clay swelling and minimization of swelled clay impact in hydrocarbon-bearing formations; created or increased secondary permeability in subterranean formations, for example, in shale, carbonate, and mudstone formations; mitigated formation damage and blockage resulting from man-induced activities and treatments in well bores and hydrocarbon bearing subterranean formations; enhanced hydraulic fracturing; enhanced explosive or propellant fracturing; enhanced resultant hydrocarbon oil and gas recovery as the result of using laterals, horizontal wells or jetting to introduce compositions to hydrocarbon bearing and non-hydrocarbon subterranean formations; and enhanced hydrocarbon recovery from new or previously applied water flooding operations used to enhanced oil recovery.

The chemical waterflood process presented herein provides increased effectiveness in comparison to other existing waterflood or gas flood secondary or tertiary oil recovery methods. The use of hydrogen peroxide in the chemical-waterflood compositions presented herein provides advantages over either liquid- or gas-based pressure drive enhancement alone. The decomposition of hydrogen peroxide results in the formation 22.4 L of oxygen gas per mole of liquid hydrogen peroxide added and additionally the production of carbon dioxide gas from the oxidation of organic matter in the formation. In this invention we teach the significant advantages of providing liquid based amendments to a waterflood that produce gas phases in the formation. The addition of a liquid-based chemical formulation that generates a gas phase in situ to an oil reservoir or oil bearing subterranean formation within a reservoir decreases the relative permeability of water in water preferential flow zones and, as a result, increases the areal and vertical sweep efficiencies in comparison to a waterflood alone, by decreasing preferential and therefore less productive transport during a waterflood. The additional effects of in situ generated gas phase pressure provide an effective gas drive mechanism to enhance oil recovery associated with chemical waterflooding EOR activities.

These compositions and methods center around nano- and micro-scale emulsion catalysis processes integrating nonionic surfactant systems with terpene hydrocarbons, terpene alcohol and methyl soyate cosolvents, and ethoxylated esters, along with peroxygen free radical oxidant processes. The microemulsion catalysis design platform was modified to include oil detachment and mobilization, clay mobilization and asphaltene/paraffin emulsification and mobilization. The microemulsion catalysis system was also modified to create proppant-free fracking fluids.

A composition according to an embodiment of the invention includes a fluid for increasing flow, production, and/or recovery of hydrocarbons from a wellbore or a portion of a subterranean formation, the composition including the following: a peroxygen; a surfactant; an alkali chelate, e.g., a sodium or potassium chelate; and a cosolvent. The fluid is applied to a portion of a wellbore or an adjacent subterranean formation, for example, as a drilling fluid, a well bore treatment, for oil or gas production stimulation, for slick water fracturing, for enhanced oil recovery, and combinations of these. The peroxygen can be, for example, hydrogen peroxide, a source of hydrogen peroxide, sodium persulfate, combinations. The peroxygen compound, or source of hydrogen peroxide, can be present in a final concentration applied to the wellbore or subterranean formation that varies from 0.01 to 20 percent, for example, from 0.01 to 10 percent by weight. The pH of the composition can be adjusted if needed to avoid pH changes in the formation. The surfactant can be, for example, a non-ionic surfactant selected from a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, and combinations. The nonionic surfactant can be an ethoxylated coco fatty acid, an ethoxylated coco fatty ester, an ethoxylated cocoamide, an ethoxylated castor oil, and combinations. The polyethylene glycol (PEG) coco fatty acids can have a range of 5 to 40 PEG groups, for example, 9 PEG groups. The Hydrophile-Lipophile Balance (HLB) range for the PEG coco fatty acid can be 10 to 19, for example, an HLB of 13. The concentration range of this compound can be from 10 to 80 percent of the total surfactant in this composition.

The ethoxylated plant oil-based surfactants consisting of a PEG Castor Oil can have a range of 2.5 to 40 PEG groups, for example, 36 PEG groups. The Hydrophile-Lipophile Balance (HLB) range for the PEG Castor Oil can be 2.1 to 16, for example, an HLB of 13. The concentration range of this compound can be from 10 to 80 percent of the total surfactant in this composition. The PEG Cocamide can have a range of 2 to 20 PEG groups, for example, 6 PEG groups. The Hydrophile-Lipophile Balance (HLB) range for the PEG Cocamide can be 2 to 19, for example, an HLB of 13. The concentration range of this compound can be from 10 to 80 percent of the total surfactant in this composition. The sorbitan ester based surfactants can have the following: sorbitan monooleate with an HLB of 4.8: sorbitan monolaurate with an HLB of 8.6; sorbitan monopalmitate with an HLB of 6.5; and sorbitan monostearate with an HLB of 4.7. The fatty acid alcohol can have a chain length of from 8 to 22 carbon atoms. The ethoxylated sorbitan ester based surfactants can have the following: polyoxyethylene (20) sorbitan monooleate with an HLB of 15; Polyoxyethylene(20) Sorbitan Mono Palmitate with an HLB of 15.6; Polyoxyethylene(20) Sorbitan Mono Stearate with an HLB of 14.9; and Polyoxyethylene(20) Sorbitan Mono Oleate with an HLB of 15.0. The surfactant can be present in a final concentration as applied to the wellbore or subterranean formation that varies from 0.01 to 50 percent, for example, from 0.05 to 5 percent by weight.

Compositions and methods of embodiments according to the present invention include or require the use of a chelate, such as a mono-, di-, tri-, or tetra-sodium ethylenediaminetetraacetic acid (EDTA), a mono-, di-, tri-, or tetra-potassium ethylenediaminetetraacetic acid (EDTA) or sodium ethylenediamine-N,N-disuccinic acid (EDDS), or combinations. The selected chelate can be present in a final concentration as applied to the wellbore or subterranean formation that varies from 0.0001 to 5.0 percent by weight. For example, the chelate can be sodium EDTA.

The compositions and methods of embodiments according to the present invention include or require the use of a cosolvent, such as a terpene, for example, hemiterpene, a monoterpene, a sesquiterpene, a diterpene, a sesterterpene, a triterpene, a tetraterpene, and combinations. For example, the terpene can be a monoterpene, such as geraniol; d-limonene, or terpineol, or combinations. For example, the terpene can be a citrus derived terpene. The selected terpene concentration in the composition can be present in a final concentration as applied to the wellbore or subterranean formation that varies from 0.001% to 50% by weight, for example, from 0.01% to 10% by weight. A soy derived cosolvent, such as methyl soyate, can be a cosolvent in the composition. The methyl soyate concentration can be present in a final concentration as applied to the wellbore or subterranean formation that varies from 0.001% to 50% by weight, for example, from 0.01% to 10% by weight. Ethyl lactate, methyl lactate or ethyl acetate may also be used as cosolvents. An antioxidant can be included in the composition to stabilize and control the rate of peroxygen decay. Examples of antioxidants include plant polyphenols, such as from sorghum bran.

A method according to the present invention includes applying a liquid treatment fluid to a portion of a wellbore or a portion of a subterranean formation with a composition including the following: a peroxygen; a surfactant; an alkali chelate, e.g., a sodium or potassium chelate; and a cosolvent. The method can include the following: forming or providing the composition; and introducing the composition through a wellbore to apply it to a portion of a wellbore or a portion of a subterranean formation. The liquid treatment fluid can be applied to a portion of a wellbore or subterranean formation by pumping, displacing, or otherwise locating the fluid to a desired location within the wellbore or subterranean formation for treatment, at a rate and pressure that is less than, equal to, or greater than the reservoir hydraulic fracture pressure. The liquid treatment fluid can be applied to a portion of wellbore or subterranean formation as a drilling fluid, as a chemical treatment, in an oil, gas, or water flow stimulation method, for hydraulic fracturing, in an enhanced oil recovery technique, and combinations. The liquid treatment fluid can be applied to a subterranean formation or a hydrocarbon-bearing subterranean formation that is geologically characterized as unconsolidated or consolidated and where the geologic material is, for example, sand, rock, clay, shale, carbonate, dolomite, coal, an argillaceous mineral, a mineral, or a hydrocarbon-containing geologic material, and combinations. For example, the temperature of the geological formation that can be treated using the disclosed composition and methods of this invention can ranges from 50 degrees F. to 230 degrees F.

As part of the methods for application the composition can be allowed to contact the wellbore or a portion of a well bore or subterranean formation or hydrocarbon-bearing subterranean formation for a sufficient period of time to increase flow, production, and/or recovery of hydrocarbons. The composition can be allowed to contact a portion of the well bore, the subterranean formation, a lenticular lens or other types of lens within a formation, the formation cap, the formation base, or a formation interface for a sufficient time, so that the permeability, relative permeability, and/or absolute permeability are increased, causing an increase in the flow, production, and/or recovery of hydrocarbons from the well bore. Adequate time can be allowed for contact of the disclosed composition. Such a sufficient or adequate time can be, for example, from about 1 minute, 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, or 6 months to about 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, 6 months, or 12 months. Sufficient time can be allowed for the composition to generate $O_2$ or $CO_2$ gas with sufficient gas pressure and/or mechanical energy or action to physically move, provide buoyancy to, deliver, or distribute treatment fluids vertically to structural highs and/or horizontally within fractures or preferential pathways, and to contact, focus, or concentrate treatment at a significantly less permeable portion of a subterranean formation such as a formation cap or boundary, interface, lenticular surface, zone of low permeability, area where a fracture terminates, and/or area of a formation treated with a viscous polymer that has resulted in decreased permeability. Such a sufficient time can be, for example, from about 1 minute, 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, or 6 months to about 2 minutes, 5 minutes, 15 minutes, 30 minutes, 1 hour, 2 hours, 6 hours, 12 hours, 1 day, 2 days, 4 days, 1 week, 2 weeks, 1 month, 2 months, 3 months, 6 months, or 12 months. The treatment can cause such targeted areas of a subterranean formation to have an increased permeability, relative permeability, and/or absolute permeability. The composition can be applied with sufficient time allowed for the composition to generate $O_2$ or $CO_2$ gas and gas pressure with sufficient mechanical energy and/or action to physically alter, fragment, rubblize, fracture, crack, pit, and/or create fluid preferential pathways within a portion of the treated subterranean formation, wherein the permeability, relative permeability, and/or absolute permeability is increased. The composition can be applied with sufficient time allowed for the composition to generate $O_2$ or $CO_2$ gas and gas pressure with sufficient mechanical energy and/or action to mobilize, release, migrate, realign, and/or redistribute portions of the treated subterranean formation, clays, fines (inorganic and/or organic), sand, precipitates, minerals, and/or individual grains of the treated subterranean formation. These mobilized, released, or otherwise moved components can be removed from the formation and carried into the wellbore along with produced fluids.

The composition can be applied to a well bore or a portion of a subterranean formation with sufficient time allowed for the composition to generate $O_2$ or $CO_2$ gas and gas pressure with sufficient mechanical energy and/or action to help propagate and/or distribute the treatment fluid further into the subterranean formation. The composition can be applied to a well bore or a portion of a subterranean formation with sufficient time allowed for the composition to generate $O_2$ or $CO_2$ gas and gas pressure to create or cause secondary porosity in a portion of the treated subterranean formation that results in increased permeability. The composition can be applied to a well bore or a portion of a subterranean formation with sufficient time allowed for the composition to generate $O_2$ or $CO_2$ gas and gas pressure to physically mobilize, release, migrate, realign, and/or redistribute treated fines, clay, and/or clay minerals within the subterranean formation or portion of the subterranean formation to create preferential pathways, zones of relatively higher permeability to oil, gas, and/or treatment fluids, or to create increased absolute permeability of the formation.

The composition can be applied to a well bore or a portion of a subterranean formation with the composition allowed to contact blockage or damage in a portion of the wellbore or a portion of a subterranean formation for a sufficient time at the ambient temperature of the well bore or the subterranean formation to sufficiently alter, remove, degrade, and/or dissolve the permeability damage or blockage, wherein the permeability, relative permeability, and/or absolute permeability is increased, causing an increase in the flow, production, and/or recovery of hydrocarbons. The formation damage or blockage can include clay, biological material, fines (inorganic and/or organic), precipitates, anhydrite, insoluble minerals, asphaltenes, and/or paraffins. The disclosed composition can be applied to a well bore or a portion of a subterranean formation, allowing the composition to contact a portion of the wellbore or a portion of the formation, and allowing sufficient time at the static temperature for the composition to generate $O_2$ and $CO_2$ gas and gas pressure creating sufficient energy, pressure, and/or mechanical action to sufficiently mobilize, remove, release, realign, and/or redistribute blockage or damage in the subterranean formation. Proppant materials can be introduced in a separate fracturing fluid, causing an increase in permeability, and resulting in an increase in the flow, production, and/or recovery of hydrocarbons or production fluids. The proppant in the formation may consist of sand, ceramics, resin beads, glass spheres, and/or other materials used as fracturing proppants. The composition can be applied to a well bore or a portion of a subterranean formation, allowing the composition to contact a portion of the wellbore or a portion of the formation, and allowing sufficient time at the static temperature for the composition to generate $O_2$ and $CO_2$ gas and gas pressure creating sufficient energy, pressure, and/or mechanical action to sufficiently mobilize, structurally degrade, remove, release, realign, and/or redistribute blockage or damage in the subterranean formation. Viscosity increasing polymers can be introduced as a separate treatment fluid, causing an increase in permeability, and resulting in an increase in the flow, production, and/or recovery of hydrocarbons or production fluids. The damage or blockage causing polymers can include polysaccaride polymers, cross-linked polymers, mannosidic and/or galactomannosidic linkages of guar, cellulose, cellulose derived, guars, guar derived, starches, xanthans, and/or other viscosity increasing polymers. The damage or blockage can include filter cake, where the filter cake can include cellulose, guars, starches, and/or xanthans.

The composition can be applied to a well bore or a portion of a subterranean formation, wherein at least some of the materials clogging a portion of a well bore, well bore perforations, and/or a portion of a subterranean formation outside of the well bore casing can be mobilized and recovered through a well bore, increasing the absolute permeability and/or the relative permeability of the subterranean formation to oil, and/or causing the clogged materials to be released from the well bore perforations, allowing hydrocarbon to flow more freely from the subterranean formation into a well bore.

The composition can include the following: a peroxygen; a surfactant; an alkali chelate, e.g., a sodium or potassium chelate; and a cosolvent. The composition can be introduced into a portion of the wellbore or a portion of a subterranean formation by pumping at a rate and pressure at or above the reservoir fracture pressure, wherein the permeability, relative permeability, and/or absolute permeability is increased, causing an increase in the flow, production, and/or recovery of hydrocarbons. The method of fracturing a portion of a subterranean formation can include pumping the composition at a rate and pressure at or above the fracturing pressure and allowing a sufficient time at the static temperature for the composition to generate $O_2$ and $CO_2$ gas and gas pressure, causing sufficient pressure to cause treatment fluids to further penetrate or distribute in a portion of the subterranean formation and increase permeability of the formation to a level beyond what would be possible without the use of the composition. The composition can be added to a separate treatment fluid including acids, polymers, proppants, solvents, surfactants, biocides, enzymes, hydroxides, and/or other treatment or fracturing fluids. The application of the composition (including a peroxygen, a surfactant, an alkali chelate, e.g., a sodium or potassium chelate, and a cosolvent) can be designed to generate $O_2$ and $CO_2$ gas and gas pressure to form sufficient additional pressure in the formation to cause fracturing or the generation of secondary porosity of a portion of the subterranean formation. The application of the composition can be designed to generate $O_2$ and/or $CO_2$ gas and gas pressure, in addition to pressure created by pumping the composition into a well bore, to form sufficient additional pressure for fracturing using non-viscous fluids, viscous fluids, and/or proppant. A method of incremental fracturing includes the liquid being injected below, at, or above the fracturing pressure of a formation or fracturing by application of the composition, which, upon generation of $O_2$ and $CO_2$ gas and gas pressure in situ, enables fracturing to take place. Fracturing using these methods can take place in subterranean formations that are geologically characterized as unconsolidated or consolidated. The subterranean formation can include sand, rock, clay, shale, carbonate, dolomite, coal, argillaceous minerals, minerals, and/or hydrocarbon containing geologic material. For example, the subterranean formation temperature can range from 50 degrees F. to 200 degrees F.

The a composition can be applied to a portion of the wellbore or a portion of a subterranean formation before, during, and/or after the application, igniting, shooting, firing, setting off, or detonating of explosive materials, propellants, or seismic instruments that cause sufficient pressure, gas wave, or shock wave to fracture, shatter, rubblize, and/or propagate treatment into a portion of a subterranean formation, wherein the permeability, relative permeability, and/or absolute permeability is increased causing an increase in the flow, production, and/or recovery of hydrocarbons. Upon fracturing and after introducing the composition into a portion of the subterranean formation and into natural fractures and fractures created during the fracturing process, a sufficient time at the static temperature can be allowed for the composition to generate $O_2$ and $CO_2$ gas and gas pressure and create sufficient pressure to cause the composition and/or treatment fluid to further penetrate or distribute in a portion of the subterranean formation and increase permeability. After being introduced into a portion of the subterranean formation, the composition can further penetrate or further distribute in a portion of the subterranean formation, or further distribute or propagate a separate treatment fluid in a portion of the subterranean formation, than possible without the use of the composition. The composition can be added to an existing treatment composition including explosive fluids or gels, peroxygens, acids, polymers, proppants, solvents, surfactants, biocides, enzymes, hydroxides, and/or other treatment or fracturing fluids. Using this method of application of the combined treatment fluid, the composition may be applied such that there is generation of $O_2$ and/or $CO_2$ gas and gas pressure with sufficient pressure created to cause the composition and/or treatment fluid to further penetrate or distribute in a portion of the subterranean formation and increase permeability and/or secondary porosity in the formation. Under these conditions fracturing or stimulation techniques include explosive fracturing, propellant fracturing, and/or fracturing using other high energy sources to generate sufficient gas pressure or shock wave to cause fracturing of a portion of the subterranean formation. In this method of application the injected liquids can include explosives or propellants used in the fracturing techniques in the physical form of liquids, gels, solids, shaped charges, slurry, sticks, and/or granular solids, wherein the fracturing techniques occur in a portion of a vertical or horizontal well bore, or in a portion of a drilled or jetted open hole laterally extending from the well bore, and any combination thereof in any proportion.

The composition can be applied to the drilling or jetting of a lateral open hole and/or monobore into a portion of a subterranean formation, wherein the permeability, relative permeability, and/or absolute permeability is increased causing an increase in the flow, production, and/or recovery of hydrocarbons. The composition can be introduced into a portion of the subterranean formation and into lateral open holes created during the process of drilling or jetting laterals, allowing a sufficient time at the static temperature for the composition to generate $O_2$ and/or $CO_2$ gas and pressure and create sufficient pressure to cause the composition and/or treatment fluid to further penetrate or distribute in a portion of the subterranean formation and increase permeability, so that the composition and/or a separate treatment fluid is capable of further penetrating or further distributing in a portion of the subterranean formation than possible without the use of the composition. In this method of application the composition and/or treatment fluid may consist of explosive fluids or gels, peroxygens, acids, polymers, proppants, solvents, surfactants, biocides, enzymes, hydroxides, and/or other treatment or fracturing fluids. By application of the composition during the process of drilling or jetting laterals and allowing a sufficient time at the static temperature for the composition to generate $O_2$ or $CO_2$ gas and pressure, sufficient additional pressure in the formation can be created to cause fracturing and/or the generation of secondary porosity of a portion of a subterranean formation. The composition can be applied by pumping the composition through drilled or jetted laterals into a portion of the subterranean formation at a rate and pressure that exceeds reservoir fracturing pressure, resulting in increased permeability of the formation. The composition can be pumped or otherwise introduced into a portion of a drilled or jetted lateral within a portion of the subterranean formation to treat a wall of a lateral to remove permeability damage or blockage, or remove tailings and blockage from a lateral resulting in an increase of flow through the lateral.

A method of applying the composition includes introducing the composition into a portion of a well bore or a portion of a subterranean formation, allowing a sufficient time at the static temperature for the composition to in situ react, chemically decompose, and/or generate $O_2$ and $CO_2$ gas, creating sufficient energy, pressure, mobilization, buoyancy, and/or mechanical action to cause an increase in the flow, production, and/or recovery of hydrocarbons. The method of application of the composition enables the composition and/or treatment fluid to further penetrate or distribute in a portion of the subterranean formation and increase permeability. After introduction into a portion of the subterranean formation, the composition and/or a separate treatment fluid can further penetrate or further distribute in a portion of the subterranean formation than possible without the use of the composition. In the liquid-based composition, which can include a source of hydrogen peroxide, a surfactant, a chelate, and a cosolvent, and optionally an antioxidant, the source of hydrogen peroxide can decompose to produce a gas phase, consisting of oxygen and/or carbon dioxide gas to produce gas phase pressure resulting in a pressure gradient that pushes and mobilizes at least a portion of oil and/or gas hydrocarbons, asphaltenes, paraffins, sand-, silt- and clay-sized particles, inorganic precipitates, insoluble minerals, and/or biofilms from a subterranean formation through well bore perforations and through a well bore that allows solid, liquid, viscous, and/or gaseous materials to enter the well and be removed. The produced gas phase or gas phase pressure or a combination thereof can increase the absolute permeability and/or the relative permeability of a subterranean formation to oil or gas hydrocarbons to increase the recovery of gas or oil hydrocarbons through a vertical or horizontal borehole.

The in situ produced gas phase or gas phase pressure can increase the gas-filled porosity of soil or rock pores that had preferential flow of water or other non-oil phase fluid that resulted in decreased sweep efficiency of oil, decreasing recovery of oil from a subterranean formation. By decreasing the relative permeability of the preferential flow zones through increasing the gas filled porosity, an increase in the sweep efficiency and subsequent recovery of oil from a subterranean formation after treatment is possible. Hydrogen peroxide decomposition can occur from direct reduction reactions, surface catalyzed reactions, and/or free radical decomposition reactions A method for treating a portion of a well bore or a portion of a subterranean hydrocarbon bearing formation with a composition according to an embodiment of the present invention can include:

a. Forming or providing a fluid containing a peroxygen, hydrogen peroxide, sodium persulfate, and/or sources of hydrogen peroxide;

b. Allowing the fluid sufficient mixing and contact, before or after the introduction to the wellbore, to stabilize, extend the duration of activity, delay the decomposition, and/or control the decomposition rate of the peroxygen, hydrogen peroxide, sodium persulfate, and/or sources of hydrogen peroxide once applied to the wellbore or subterranean formation;

c. Wherein the composition can react and/or treat over a longer period of time than possible with the use of a peroxygen alone;
d. Introducing the composition through a well bore to apply to a portion of a wellbore or a portion of a subterranean formation; and
e. Pumping, displacing, or otherwise locating the fluid to a desired location within the wellbore or subterranean formation to contact surface or material to be treated.

The composition according to an embodiment of the present invention can be for a drilling fluid, treatment fluid, stimulation fluid, fracturing fluid, and/or a fluid used in an enhanced oil recovery technique. The composition for the treatment of a portion of a wellbore or a portion of a subterranean hydrocarbon bearing formation, including a peroxygen, hydrogen peroxide, sodium persulfate, and/or source of hydrogen peroxide, can be stabilized, extended in the duration of activity, and/or delayed in the decomposition and/or the decomposition rate can be controlled.

A peroxygen, such as sodium persulfate, can be used as a stabilized oxidant for fracking liquid breaking and fracture cleanout, either in combination with hydrogen peroxide or separately. Stabilization of peroxygen-based oxidants with USDA Generally Recognized as Safe (GRAS) non-ionic surfactants and antioxidants, such as plant derived polyphenols, can be used to control the decomposition rate of the hydrogen peroxide, for example, when used for waterflooding, near field treatment, and fracture cleanup applications. The composition can be augmented to include terpinoid alcohols, various non-ionic surfactants, metal chelating agents, gelling agents, and/or thickeners.

The composition can include a surfactant either separately or in combination with a plant derived polyphenol to stabilize hydrogen peroxide alone or in combination with sodium persulfate. The stabilization of the peroxygen or mixture of peroxygens in the composition by the surfactant alone or in combination with a plant polyphenol extends the period of time that the peroxygen remains active as an oxidant in the well bore and in the adjacent subterranean hydrocarbon formation. The free radical and direct oxidation reduction pathway of the hydrogen peroxide or a hydrogen peroxide producing compound provides mechanical energy associated with its decomposition, resulting in the generation of a gas phase and gas phase pressure. Concentrations of hydrogen peroxide in methods according to an embodiment of the present invention can be lower than that for the production of heat energy and in situ combustion as taught in U.S. Pat. No. 4,867,238 (Bayless).

The free radical and direct oxidation reduction pathway when a hydrogen peroxide forming oxidant or sodium or potassium persulfate is the sole peroxygen used or a component of peroxygen mixture can result in oxidation of drilling fluid and fracking fluid viscosity enhancers, such as polymers or biopolymers, including but not limited to guar, xanthan, and polysaccharides, reducing over time the viscosity of the fluids by degrading components of the polymers. The reduction of the polymer viscosity can cause the relative permeability of the formation to oil or gas to increase following treatment of a well bore or a subterranean formation by viscosity increasing materials and fluids. The reduction of the polymer viscosity can enables return to a well bore from an adjacent hydrocarbon bearing subterranean formation new, recent, or older applied viscosity increasing fluids. Hydrogen peroxide and sodium persulfate can cause oxidation of bacterial biofilms and gelled solids that clog the well bore, near the well bore and in the adjacent subterranean formation.

pH control of the composition can be enabled by use of alkalinity increasing pH buffers, such as caustic soda, sodium carbonate, sodium bicarbonate, lime or hydrated lime or with organic or inorganic acids in the case of lowering pH. Oxygen and/or carbon dioxide gases associated with the direct and free radical decomposition of hydrogen peroxide in the composition can be formed. Peroxygen oxidation of portions of the organic and biological materials associated with bioclogging can result in carbon dioxide formation.

A component of a composition according to an embodiment of the present invention is hydrogen peroxide or a hydrogen peroxide forming compound. Upon decomposition, hydrogen peroxide follows either a direct or free radical reduction reaction producing 22.4 L of oxygen gas per mole (34 g) of hydrogen peroxide at standard temperature and pressure (STP):

$$2H_2O_{2(aq)} \rightarrow 2H_2O_{(aq)} + O_{2(g)}$$

The decomposition of hydrogen peroxide in the presence of inorganic transition metals, either naturally present in pore liquids (oil or water) or the formation, can lead to the production of free radicals (direct and indirect) that oxidatively degrade various types of organic matter and produce carbon dioxide gas. The combined action of a composition including a peroxygen, surfactant, alkali chelate, e.g., a sodium or potassium chelate, and a cosolvent will initially liquefy inorganic and organic chemicals, including clays that clog the near field pore space and the perforations in the well casing. The production of oxygen and carbon dioxide gas can provide pressure that further propagates through the formulation, mechanically breaks down clogs and low perm blockages, and pushes the liquefied material through the subterranean formation and through perforations in the well bore and into the well, where it can be removed.

The composition and the methods of application according to embodiments of the present invention can benefit a number of gas-, mechanical-, and chemical-based EOR processes that can be applied synergistically. This can be done without the need for expensive equipment on site to generate components of the composition. The combined mechanical energy associated with in-situ $O_2$ and/or $CO_2$ gas production and the associated gas pressure exerted by these gases, along with decreased interfacial tension, chemical breaking of bound water (water-in-oil emulsions), formation, dissolution, precipitation, or separation of organic solids, formation, dissolution, precipitation, or separation of insoluble inorganic solids, and nano- and micro-scale emulsions formed by the nonionic surfactants and cosolvents, can create an effective environment for oil detachment and mobilization from mineral surfaces, mobilization of polymers, clays, clay sized particles, biological materials, and/or precipitates clogging the subterranean hydrocarbon formation. As a result, the relative permeability of the formation to hydrocarbon oil or gas can increase along with the absolute permeability of the formation itself.

The nonionic surfactants taught in this invention are applicable over a wide pH range and are not limited with respect to either carbonate or sandstone rock or their derived sands. Because nonionic surfactants are not significantly sorbed onto geological material, they are transported well through geologic media and are more available to react with crude oil components. This overcomes the typically high adsorption losses of anionic and cationic surfactants to the formation, which decrease their effectiveness and increase the quantities and cost associated with the use of anionic and cationic surfactants.

The nonionic surfactants used in compositions according to an embodiment of the present invention can be effective over a wide range of brine concentrations (i.e., ionic strength). These oil-in-water systems enable emulsification and/or mobilization, resulting in transport of oil and gas in formations with significant formation water brine concentrations that can inhibit oil recovery. Brine sensitive anionic surfactants commonly used in EOR applications can be brine concentration sensitive and require extensive analysis to determine optimum brine concentrations in which the anionic surfactants can be effective. In many EOR applications where brine concentrations are too high, expensive preflush waterflooding with large volumes of low salinity water is required to decrease the brine concentration in the formation to with an acceptable range.

The selection of peroxygens, surfactants, alkali chelates, e.g., sodium or potassium chelates, and cosolvents can be varied for specific applications. The in situ production of a gas phase and gas pressure upon injection of a liquid phase can result in the increased effectiveness of waterflood treatments through several mechanisms. One mechanism is the reduction of the relative permeability of the formation to water in zones of preferential water flow in a formation, which decreases sweep efficiency of a waterflood. In zones of initially higher water permeability in a formation, the increase in the gas-filled porosity caused by the in situ decomposition of hydrogen peroxide results in a decrease in waterflooding channeling and short circuiting to extraction wells. During a waterflood, zones of initially higher water relative permeability form preferential flow channels, resulting in short-circuiting of the waterflood and reducing the areal and vertical sweep efficiency of the process. The presence of hydrogen peroxide in the liquid Component B (described below) of the waterflood amendment will initially travel with the water into and through the higher permeability to water zones. As the hydrogen peroxide decomposes in the formation through either direct oxidation or free radical pathways, it forms large volumes of oxygen gas (i.e., 22.4 L gas per mole of liquid hydrogen peroxide reduced). These large volumes of produced gas and associated gas pressure initially displace water from the initially higher water content pores and fractures. As the aqueous phase hydrogen peroxide forms gas, the gas replaces a substantial fraction of the water in these initially higher water saturated pores and fractures, decreasing the capability of the pore to transmit water As such, the short-circuiting (and associated loss of sweep efficiency and effectiveness) of the water flood is decreased and the sweep efficiency of a waterflood operation increases.

As the hydrogen peroxide reacts with components of the formation, it can become reduced by direct oxidation reactions with the formation mineralogy, inorganic or organic constituents associated with the crude oil, enzymes such as catalase associated with biological material, and other reductants that may be present in the formation matrix and pore liquids. Hydrogen peroxide can be catalyzed to form free radicals by components of the formation mineralogy, certain organic or inorganic compounds associated with the crude oil, such as transition metal porphyrins and transition metals in the water phase, solid phase transition metals associated with the formation, and metal precipitates. With Component B an alkaline chelate can be added to the formation to chelate metals associated with the formation matrix or pore liquids.

Hydrogen peroxide can oxidize organic constituents in the oil or biological components in the formation to form carbon dioxide gas, providing additional gas-filled porosity. The hydrogen peroxide and free radicals created associated with the hydrogen peroxide decomposition can kill and decrease populations of iron- and sulfate-reducing bacterial populations, increasing the absolute permeability of a formation. The result of direct oxidation and free radical pathway reduction of hydrogen peroxide is oxygen gas.

Antioxidants, such as plant polyphenols, can be added to Component A (described below) to delay the rate of hydrogen peroxide decomposition, enabling the further penetration of the hydrogen peroxide into a formation. This can result in a more uniform and greater three-dimensional volumetric distribution of hydrogen peroxide in a formation prior to its decomposition.

The presence of gas filled porosity in the pore space with oil can result in the formation of larger oil particles as a result of oil coating "blanketing" gas molecules (Cole, 1969).] The larger effective size of the oil in the pore space decreases the residual oil left in the pore space and the formation. The presence of a gas phase in an oil/water saturated pore space decreases the amount of oil that remains in the pore space and results in oil displacement from the pore space. This increases extraction of oil from a formation.

Nonionic surfactant components of Component A of the disclosed composition decrease the interfacial tension between the water and oil phases and result in detachment of oil from the matrix, capillaries, and pore space within the matrix. The addition of hydrogen peroxide, and its subsequent oxidation reactions, also destroys organic biofilms that reduce the absolute permeability of a formation, increasing overall permeability of a formation, as well as increasing areal and vertical sweep efficiency of a waterflood event. The combined nonionic surfactant/cosolvent/hydrogen peroxide/sodium chelate/antioxidant components of compositions according to an embodiment of the present invention have been shown to mobilize clay-sized particles that clog matrix porosity, resulting in an increase in the absolute porosity of the formation and decreasing short circuiting and preferential flow of liquids and gases in flooding operations.

Salinity of the Component A and/or Component B composition can be adjusted for optimal impact on clay size particles and surfactant effectiveness. The pH of Component A and/or Component B can be adjusted for optimal in situ surfactant production associated with alkaline hydrolysis reactions and components of the oil. Polymers such as xanthan gum, guar gum, and hydrolyzed polyacrylamide can be added to Component A or optionally can be injected in a polymer drive following the addition of the combined nonionic surfactant/cosolvent/hydrogen peroxide/sodium chelate/antioxidant components of a composition according to an embodiment of the present invention.

Waterflood salinity control has been used in sandstone oil formations to hydrate, swell, and transport clays by advective and dispersive forces. Upon dispersion of the clay particles, transport through zones of initially higher water permeabilities occurs. However, increased clay transport can lead to settling and lodging of the clay particles in the pore space. This can subsequently lead to a decrease in the water permeability and reduced water transport in the initially higher water permeability zones. Consequently, water is forced to take alternate paths into zones of higher relative water permeability than that of the reduced permeability zones. This leads to a formation with more uniform permeabilities and results in an improved mobility of a waterflood. Short circuiting of the waterflood can be reduced as a result of a salinity controlled waterflood, and the mobility ratio and hence sweep efficiency of the waterflood can be improved (Boston, U.S. Pat. No. 3,740,956, Oct. 7, 1969), Martin (1959) and Bernard (1967) reported that clay swelling and/or dispersion resulted in increased injection pressure and increased oil recovery.

The overall process of waterflood salinity control results in decreases in the relative permeability of initially higher permeability materials and increased oil recovery.

The observed decrease in the relative permeability of water in zones of initially high water permeabilities resulting from waterflood salinity control and resulting increased oil recovery illustrates a strategy of reducing preferential waterflood short circuiting, by decreasing the water relative permeability in said zone. In an embodiment according to the present invention, the addition of a liquid phase amendment resulting in the in situ generation of a gas phase can decrease the water relative permeability in zones of initial higher water relative permeability and increase oil production associated with a waterflood. The coupled effects of in situ gas generation and of addition of non-ionic surfactants and cosolvents along with direct and free-radical oxidation reactions, lowering interfacial tension, forming microemulsions, oxidizing biofilms, mobilizing clays, and killing iron- and sulfate-reducing bacteria produce favorable results. In addition to the processes activated during the use of Component A and Component B in a waterflood as described herein, there may be additional reactions, mechanisms, and processes resulting in the effectiveness of the process that are currently unknown or not fully mathematically described.

Compositions and methods according to the present invention can be used in drilling fluids in completion of a well bore, in treating a portion of a well bore or a portion of a subterranean formation to increase permeability, in fracturing, and in secondary and tertiary recovery techniques such as water flood, chemical flood, matrix treatments, and steam injection.

The following examples are intended to illustrate and not limit the invention:

Cleaning a well bore clear of organic and inorganic deposits and blockages.

Removing blockages and damage from well bore perforations and formations. Clays can be treated, so that they no longer reduce permeability, permeability and flow to the well can be increased, and clays can readily be pumped along with production fluids. Collected samples demonstrate that clays contacted with a composition according to an embodiment of the present invention no longer exhibit the capacity to swell or react with fresh or brine water. These effects can be non-reversible.

Generation of $O_2$ and/or $CO_2$ gas and gas pressure in situ.

Delay or time release of $O_2$ and/or $CO_2$ gas generation and gas pressure in situ. Sustained $O_2$ and $CO_2$ gas generation and gas pressure produced in situ.

Well bore and matrix/formation treatment, resulting in improved permeability of the formation and improved flow of production fluids and hydrocarbons.

A composition according to an embodiment of the present invention can be provided as a two part system (Component A and Component B). Components A and B can be mixed before use to meet specific application requirements (e.g., well bore cleaning, water floods, fracturing, fracture cleanout). The formulations disclosed herein can vary with respect to the specific compositions of two-part systems.

For example, the compositions of Component A and Component B in an aqueous-based concentrated form, such as used in the Examples below, can be as follows:
Component A in a concentrate form can include:
Ethoxylated Fatty Acid—25 g/L to 350 g/L
Surfactant/Terpene Mixture—25 g/L to 400 g/L
Sodium EDTA—0.2 to 20 g/L
Component B in a concentrate form can include:
Hydrogen Peroxide—25 g/L to 400 g/L
Surfactant/Terpene Mixture—5 g/L to 50 g/L For example, component A can include the following: ethoxylated fatty acid in a concentration of from about 25 g/L, 35 g/L, 50 g/L, 75 g/L, 100 g/L, 150 g/L, or 250 g/L to about 100 g/L, 150 g/L, 250 g/L, or 350 g/L; surfactant/terpene mixture in a concentration of from about 25 g/L, 35 g/L, 50 g/L, 75 g/L, 100 g/L, 150 g/L, 250 g/L, 350 g/L, or 400 g/L to about 250 g/L, 350 g/L, 400 g/L, or 500 g/L; and sodium EDTA in a concentration of from about 0.2 g/L, 0.3 g/L, 0.5 g/L, 0.7 g/L, 1 g/L, 2 g/L, 5 g/L, 10 g/L, 20 g/L, 30 g/L, or 50 g/L to about 10 g/L, 20 g/L, 30 g/L, 50 g/L, 70 g/L, or 100 g/L. For example, component B can include the following: hydrogen peroxide in a concentration of from about 25 g/L, 50 g/L, 75 g/L, 100 g/L, 150 g/L, 200 g/L, 300 g/L, 340 g/L, or 400 g/L to about 300 g/L, 400 g/L, or 500 g/L; and surfactant/terpene mixture in a concentration of from about 5 g/L, 7 g/L, 10 g/L, 20 g/L, or 30 g/L to about 10 g/L, 20 g/L, 30 g/L, or 50 g/L. The ratio of surfactant to terpene in the surfactant/terpene mixture, on a mass basis, can be, for example, from about 50:1, 35:1, 20:1, 10:1, 9:1, 8:1, 7:1, 5:1, 3:1, 2:1, 1.5:1, 1.2:1, or 1:1 to about 1:1, 1:1.2, 1:1.5, 1:2, 1:3, 1:5, 1:7, 1:8, 1:9, 1:10, 1:20, 1:35, or 1:50 independently in Component A and in Component B.

Application consists of mixing each of the respective Component A with the surfactant-stabilized hydrogen peroxide mixture (Component B) and diluting with fresh or brine water. The hydrogen peroxide can be stabilized with plant-based non-ionic surfactants and terpene hydrocarbons and, alternatively, plant polyphenols, and can be augmented with less than 1% acids and less than 1% alkali to produce mixtures. Without limitation, applications include the following:
Wellbore Treatment: Component A 0.5% to 10% (e.g., 1%-5%); Component B 0% to 12% (e.g., 1%-4%)
Matrix Treatment Component A 0.1% to 10% (e.g., 0.5%-5%); Component B 0% to 10% (e.g., 0.3%-4%)
Water Flood/Injection/Secondary Recovery Techniques: Component A 0.05% to 5% (e.g., 0.05%-3%); Component B 0% to 10% (e.g., 0.1%-4%)
Fracture Cleanout Component A 0.1% to 10% (e.g., 1%-5%); Component B 0% to 10% (e.g., 1%-4%)
Fracturing of Formation (slick water fracking): Component A 0.1% to 10% (e.g., 0.1%-2%); Component B 0% to 10% (e.g., 0.5%-4%)
Oil Mobility/Water Break/Oil Marketability Treatment: Component A 0.01% to 10% (e.g., 0.1%-2%); Component B 0% to 10% (e.g., 0.1%-1%)
Well Completion Cleanup: Component A 0.1% to 10% (e.g., 1%-5%); Component B 0% to 10% (e.g., 1%-4%)

Factors relevant to the dilution of Component A and Component B concentrates with water include the specific objectives of the application, and are based on, for example, temperature, oil properties, characteristics of the blockages to be removed, and formation characteristics.

Composition according to an embodiment of the present invention exhibit good performance over a wide range of concentrations in application. The composition is easy to dilute and apply, mixing of respective treatment solution Components A and B with water can readily be accomplished with standard mixing or pumping equipment, and does not require high shear pumps or specialized mixing equipment as may be required by more traditional surfactant-based formulations, such as alkali surfactant polymer (ASP) mixes. Once mixed, treatment solutions according to an embodiment of the present invention form a stable nano- and micro-scale oil in water emulsions that will not phase separate under standard field conditions of temperature (above freezing), pressure, pH, and brine concentration. Unlike traditional surfactant formulations used in the oil and gas field, the treatment solutions can be mixed with available produced water (fresh or brine), and the treatment solution's ability to mix and perform in the intended application is tolerant of common produced water properties, such as elevated dissolved solids, chlorides, pH, and buffering intensity. The composition according to an embodiment of the present invention is effective over a wide range of temperatures from 50 degrees F. to over 200 degrees F.

The composition is readily biodegradable once applied in the natural environment, and is environmentally friendly as characterized by low toxicity levels compared to petroleum-derived compositions.

Peroxygen

The peroxygen may be, for example, hydrogen peroxide, a source of hydrogen peroxide, sodium persulfate, potassium persulfate, or any combination thereof.

Surfactants

The surfactants may be, for example, biodegradable surfactants. In some embodiments, all the surfactants in the composition are biodegradable. The surfactant may be, for example, an ethoxylated plant oil-based surfactant. In some embodiments, all the surfactants in the composition are ethoxylated plant oil-based surfactants.

The surfactant may be, for example, a fatty alcohol ethoxylate, a fatty acid ethoxylate, fatty acid amide ethoxylate a fatty acid ester, a fatty acid methyl ester ethoxylate, an alkyl polyglucoside, a polyalcohol ethoxylate, sorbitan ester, a soy alkyltrimethyl ammonium chloride, or combinations thereof. In some embodiments, the surfactant is a mixture of a one or more fatty acid ethoxylate and one or more fatty acid amide ethoxylate.

The surfactant may be, for example, a mixture of an ethoxylated coco fatty acid, an ethoxylated coco fatty ester, an ethoxylated cocoamide, and an ethoxylated castor oil.

In some embodiments the surfactant is a polyethylene glycol (PEG) coco fatty acids. The surfactant may have 5 to 40 PEG groups. In some embodiments, the surfactant has more than 5, 6, 7, or 9 PEG groups. In some embodiments, the surfactant has less than 40, 35, 30, 25, or 20 PEG groups. In some embodiments, the surfactant has 9 PEG groups. The hydrophile-lipophile Balance (HLB) may be, for example, between about 10 and about 19. In some embodiments, the HLB may be more than about 10, 11, 12, or 13. The HLB may be less than about 19, 18, 17, 16. HLB of about 13. The PEG coco fatty acid concentration may be between about 10 to about 80 percent of the total surfactant in the composition. In some embodiments, the PEG coco fatty acid concentration may be more than about 12, 15, 20, 25, 30 percent of the total surfactant in the composition. In some embodiments, the PEG coco fatty acids may be less than about 80, 75, 70, 65, or 60 percent of the total surfactant in the composition.

In some embodiments, the surfactant is polyethylene glycol (PEG) Castor Oil. The PEG Castor Oil ma have 2.5 to 40 PEG groups. The PEG castor oil may have more than 2.5, 5, 10, or 15 PEG groups, or less than about 40, 38, or 36 PEG groups. In some embodiments, the PEG castor oil has 36 PEG groups. The hydrophile-lipophile balance (HLB) may be between about 2.1 and about 16. The HLB may be more than 2.1, 3.0, 4.5, 5.0, or 7.0, or less than about 16, 15, 14, or 13. In some embodiment, the PEG castor oil has an HLB of 13. The PEG castor oil concentration may be between about 10 and about 80 percent of the total surfactant in the composition. The concentration may be more than about 12, 15, 20, 25, or 30 percent, or less than about 80, 75, 70, 65, or 60 percent of the total surfactant in the composition.

In some embodiments, the surfactant is polyethylene glycol (PEG) cocamide. The PEG cocamide may have, for example, 2 to 20 PEG groups. The PEG cocamide may have more than 2, 3, 4, 5, or 6 PEG groups, or less than 20, 18, 15, 12, or 10 PEG groups. The PEG cocamide may have, for example, 6 PEG groups. The PEG cocamide may have a hydrophile-lipophile balance (HLB) between about 2 and about 19. The HLB may be more than about 2, 3, 5, 7, or 10, or less than about 19, 17, 15, 13. The PEG cocamide HLB may be, for example, about 13. The PEG cocamide concentration may be between about 10 and about 80 percent of the total surfactant in the composition. The PEG cocamide concentration may be more than about 10, 12, 15, 20, 25, or 30 percent, or less than about 80, 75, 70, 65, or 60 percent of the total surfactant in the composition.

In some embodiments, the surfactant is a sorbitan ester based surfactant. The sorbitan ester based surfactant may be, for example, sorbitan monooleate with an HLB of 4.8, sorbitan monolaurate with a HLB of 8.6, and sorbitan monopalmitate with a HLB of 6.5, sorbitan monostearate with a HLB of 4.7.

In some embodiments, the surfactant is a fatty acid alcohol. The fatty acid alcohol may have between 8 and 22 carbon atoms. The fatty acid alcohol may have more than 8, 10, or 12, and less than 22, 20, or 18 carbon atoms.

In some embodiment, the surfactant is an ethoxylated sorbitan ester-based surfactant. The ethoxylated sorbitan ester-based surfactant may be, for example, polyoxyethylene (20) sorbitan monooleate with an HLB of 15, Polyoxyethylene (20) Sorbitan Mono Palmitate with a HLB of 15.6, Polyoxyethylene(20) Sorbitan Mono Stearate with a HLB of 14.9, Polyoxyethylene(20) Sorbitan Mono Oleate with a HLB of 15.0.

Chelates

The alkali metal chelate is a chelate of an alkali metal. Alkali metals include lithium (Li), sodium (Na), potassium (K), rubidium (Rb), and cesium (Cs). The alkali metal chelate may be, for example, a mono-, di-, tri- or tetra-sodium ethylenediaminetetraacetic acid (EDTA), a mono-, di-, tri- or tetra-potassium ethylenediaminetetraacetic acid (EDTA), sodium ethylenediamine-N,N'-disuccinic acid (EDDS) or combination thereof. In some embodiments, the alkali metal chelate is sodium EDTA.

Cosolvents

The cosolvent may be, for example, a terpene. In some embodiments, the terpene may be a citrus derived terpene. In some embodiments, the terpene may be, for example, a hemiterpene, a monoterpene, a sesquiterpenes, a diterpene, a sesterterpene, a triterpene, a tetraterpene, or combination thereof. In some embodiments, the terpene is a monoterpene, such as, for example, geraniol, d-limonene, terpineol, linalool, or combinations thereof. In some embodiments, the cosolvent is a mixture of monoterpenes. In some embodiments the terpene is a terpene mixture with a vapor pressure lower than d-limonene. The mixture of terpenes may be, for example, a distillation fraction of a terpene extract. The distillation fraction may contain, for example, less than 50%, less than 40%, less than 30%, or less than 20% d-limonene.

In some embodiments, the cosolvent is methyl soyate, ethyl acetate, ethyl lactate, and/or methyl lactate.

Methods

Embodiments of the invention include methods including introducing a composition having a) a peroxygen, b) a surfactant, c) an alkali metal chelate, and d) a cosolvent into the wellbore of a hydrocarbon extraction wellbore or a hydrocarbon bearing subterranean formation. The composition has a pH less than about 10 or a concentration of alkali metal chelate greater than about 0.2% and less than about 5% by weight of the non-water components.

As used herein, a hydrocarbon extraction wellbore can be the wellbore of a well drilled for extracting hydrocarbons (i.e. petroleum, oil, or natural gas) from the ground. The wellbore can be distinct from a well drilled to inject material into the ground; that is, material may not be injected through the wellbore into the ground. Alternatively, material may be injected through the wellbore into the ground. As used herein, a hydrocarbon-bearing subterranean formation is a geologic formation beneath the ground having a concentration of hydrocarbons (i.e. petroleum, oil, or natural gas) sufficient to induce removal of the hydrocarbons for purposes of refinement. The hydrocarbon-bearing subterranean formation may currently be being exploited. As used herein, a hydrocarbon-bearing subterranean formation is not a contaminated subsurface region contaminated by trace or low quantities of hydrocarbon contaminants that is a target for environmental remediation.

In some embodiments, the composition pH is less than about 10, less than about 9.5, less than about 9.0, less than about 8.5, or less than about 8.0. In some embodiments, the composition pH is greater than about 4.0, greater than about 4.5, greater than about 5.0, greater than about 6.0, or greater than about 6.5. The pH may be measured before introduction into the wellbore or subterranean formation. In some embodiments, the alkali metal chelate concentration is greater than about 0.2%, greater than about 0.5%, greater than about 1%, or greater than about 1.5% by weight of the non-water components. In some embodiments, the alkali metal chelate concentration is less than about 5%, less than about 4%, or less than about 3% by weight of the non-water components. The percentage by weight is determined by dividing the weight of alkali metal chelate in the composition by the total weight of all the ingredients that are not water.

The composition may be mixed with water, fresh water, brine water, water from the formation, water with potassium chloride added, or any combination thereof prior to introduction into the wellbore or subterranean formation.

In some embodiments, the composition has a concentration in water of 0.01% to 99.9%, for example, 0.01% to 25%, when introduced into the wellbore or subterranean formation. The concentration is determined by dividing the total weight of the peroxygen, surfactant, alkali metal chelate, and cosolvent by the total weight of the composition. In some embodiments, the concentration is greater than about 0.01, 0.05, 0.1, 0.2, 0.5, 0.6, 0.8, 1 or 2 percent by weight. In some embodiments, the concentration is less than about 25, 22, 20, 15, 10, 9, 7, 6, or 3 percent by weight.

In some embodiments, the concentration of the peroxygen introduced into the wellbore or subterranean formation is between about 0.01 and about 20 percent by weight. The concentration is determined by dividing the weight of the peroxygen by the total weight of the composition when it is introduced into the wellbore or subterranean formation. In some embodiments, the concentration of peroxygen is greater than about 0.01, 0.05, or 0.1 percent by weight. In some embodiments, the concentration of peroxygen is less than about 15, 12, 10, 8, or 5 percent by weight. In some embodiments the concentration of peroxygen relative to the non-water components is greater than about 1, 2, 5, or 10 percent by weight. In some embodiments the concentration of peroxygen relative to the non-water components is less than about 35, 30 or 25 percent by weight relative to the non-water components. The concentration relative to the non-water components is determined by dividing the weight of peroxygen by the total weight of the non-water components.

In some embodiments, an organic acid, mineral acid, or a base is added to the composition to adjust the pH. The acid may be, for example, hydrochloric, hydrofluoric, formic, citric or acetic acid. The base may be, for example, hydrated or non hydrated lime, caustic soda, sodium bicarbonate, or potassium hydroxide.

The surfactant concentration in the composition when introduced into the wellbore or subterranean formation may be between about 0.01 and about 50 percent by weight. The concentration is measured by dividing the weight of the total surfactant by the total weight of the composition. The concentration may be greater than about 0.01, 0.03, 0.05, 0.1, 0.5, or 1 by weight or less than about 50, 45, 40, 35, 30, 25, 20, 15, 10, or 5 percent by weight. Relative to the non-water components, the surfactant concentration may be greater than about 5, 10, 15, 20, 25, or 30 percent or less than about 95%, 90%, 85%, 80%. The concentration relative to the non-water components is determined by dividing the weight of surfactant by the total weight of the non-water components in the composition.

The chelate concentration in the composition when introduced into the wellbore or subterranean formation may be between about 0.00001 to 5.0 percent by weight. The concentration is determined by dividing the weight of the chelate by the total weight of the composition. The concentration may be greater than about 0.0001, 0.00002, 0.0001, 0.001, 0.002, 0.01, or 0.1 percent. The concentration may be less than about 5.0, 4.0, 3.0, 2.0, 1.0, or 0.5 percent. The chelate concentration, relative to the non-water components may be between about 0.2 and about 5 percent by weight. The concentration relative to the non-water components is determined by dividing the weight of the chelate by the total weight of the non-water components of the composition. The concentration, relative to the non-water components, may be greater than about 0.2, 0.5, 0.7, or 1.0 percent, or less than about 5, 4.5, 4, 3.5, 3, 2.5, or 2 percent by weight.

The cosolvent concentration in the composition when introduced into the wellbore or subterranean formation may be between about 0.001 and about 50 percent. The concentration is determined by dividing the weight of cosolvent by the total weight of the composition introduced into the wellbore or subterranean formation. In some embodiments, the concentration of cosolvent is greater than about 0.001, 0.002, 0.005, 0.007, or 0.01 percent. In some embodiments, the cosolvent concentration is less than about 50, 30, 25, 20, 15, 10, 8, or 5 percent. The cosolvent concentration, relative to the non-water components may be between about 1 and about 40 percent by weight. The concentration, relative to the non-water components, is determined by dividing the weight of cosolvent by the total weight of the non-water components in the composition. The concentration, relative to the non-water components may be greater than about 1, 5, 7, 10, 12, or 15 by weight. The concentration, relative to the non-water components may be less than about 80, 75, 70, 65, 60, 55, 50, 45, or 40 percent by weight.

In some embodiments, the composition further comprises an antioxidant. The antioxidant may be, for example, a plant-derived polyphenol. The plant-derived polyphenol may be, for example, derived from sorghum bran.

In some embodiments, after the composition is introduced into the wellbore or subterranean formation, the wellbore or subterranean formation is contacted for a period of time sufficient to increase flow, production, or recovery of hydrocarbons.

The composition may be introduced into the wellbore or subterranean formation by, for example, pumping, displacing, or locating the composition at a desired location. In some embodiments, the pumping, displacing, or locating the composition is at a rate and pressure less than the reservoir hydraulic fracture pressure.

In some embodiments, the composition is introduced into the subterranean formation at a rate and pressure equal to or greater than the reservoir hydraulic fracture pressure. After introduction, the composition generates $O_2$ and/or $CO_2$ gas and gas pressure. In some embodiments, a separate treatment fluid is introduced into the wellbore or subterranean formation. The separate treatment fluid may include, for example, acids, gases, liquids, polymers, proppants, solvents, surfactants, biocides, enzymes, hydroxides, other treatment or fracturing fluids, or combinations thereof. The gas pressure may be sufficient to cause the separate treatment fluid to penetrate further into the portion of the subterranean formation than possible without the introduced composition. In some embodiments, the pressure may be sufficient to fracture, generate secondary porosity, or both, in the subterranean formation.

Some embodiments include fracturing the subterranean formation. Fracturing may include, for example, slick water fracturing, fracturing using non-viscous fluids, fracturing using viscous fluids, fracturing using viscous fluids and proppant, or any combination thereof. The subterranean formation may be geologically characterized as unconsolidated or consolidated. The subterranean formation may include, for example, sand, rock, clay, shale, carbonate, dolomite, coal, argillaceous minerals, minerals, or hydrocarbon containing geologic material, and combinations thereof. The subterranean formation temperature may be between about 50 degrees F. and about 200 degrees F.

The composition may be applied to the wellbore or subterranean formation as a drilling fluid, treatment fluid, stimulation fluid, fracturing fluid, a fluid used in a enhanced oil recovery technique, or combination thereof.

Wellbore

The composition may be introduced, for example, into the wellbore. The wellbore may be sealed after introducing the composition. In some embodiments, the wellbore may be left open to the atmosphere. In some embodiments, the composition is removed from the wellbore after introduction. The composition may be removed from the wellbore, for example, by pumping or flushing.

Lateral Wellbore

The wellbore may be a lateral wellbore. In some embodiments, the composition is pumped or otherwise introduced into a portion of a drilled or jetted lateral. In some embodiments, sufficient composition is introduced to remove damage or blockage, or remove tailings and blockage from the lateral. In some embodiments, the composition is introduced before, during or after drilling or jetting a lateral open hole or monobore into the subterranean formation. In some embodiments, the composition is pumping into the drilled or jetted laterals at a rate and pressure that exceeds reservoir fracturing pressure. The composition may generate $O_2$ and/or $CO_2$ gas and gas pressure in the lateral wellbore. In some embodiments, a treatment fluid is introduced into the later wellbore. The composition may produce pressure sufficient to cause the treatment fluid to further penetrate or distribute in a portion of the subterranean formation. In some embodiments, the treatment fluid may include, for example, explosive fluids or gases, gels, peroxygens, acids, polymers, proppants, solvents, surfactants, biocides, enzymes, hydroxides, or other treatment or fracturing fluids, or combinations thereof. In some embodiments, the pressure is sufficient to fracture or generate secondary porosity in the subterranean formation.

Subterranean Formation

The composition may be introduced, for example into a subterranean formation. The subterranean formation may include, for example, a lenticular lens or other heterogenaties, such as grain size changes, formation cap, formation base, or formation interface. The subterranean formation may be geologically characterized as unconsolidated or consolidated. The subterranean formation may include, for example, sand, rock, clay, shale, carbonate, dolomite, coal, argillaceous minerals, minerals, or hydrocarbon containing geologic material, and any combination thereof. The subterranean formation temperature may be between about 50 degrees F. and 230 degrees F.

Contacted Materials

The introduced composition may be brought into contact with fines, clay, polymers, proppants, damages, or blockages. The composition may contact fines, clay or clay minerals in a portion of the wellbore, subterranean formation, lenticulars or lenses within the subterranean formation, formation cap, formation base, or formation interfaces. The composition may, for example, denature, delaminate, stabilize, reduce swelling of, prevent swelling of, or any combination thereof, the fines, clay or clay minerals. The contact may produce $O_2$ and/or $CO_2$ gas and creates gas pressure. The pressure may be sufficient to physically mobilize, release, migrate, realign, or redistribute the fines, clay or clay minerals. The contact may create preferential pathways, zones of relatively higher permeability, or increased permeability.

The introduced composition may be brought into contact with, for example, blockage or damage in the wellbore or subterranean formation. The contact may alter, remove, degrade, or dissolve the blockage or damage. The damage or blockage may include, for example, clay, biological material, inorganic fines, organic fines, precipitates, anhydrite, insoluble materials, asphaltenes, paraffins, or combinations thereof. In some embodiments, at least some of the blockage or damage materials are mobilized into the wellbore. In some embodiments, at least some of the blocking and/or damage materials are recovered from the wellbore.

In some embodiments, the blockage or damage includes proppant materials. The proppant materials may have, for example, been introduced in a separate fracturing fluid. The proppant may include, for example, sand, ceramics, resin beads, glass spheres, other materials used as a fracturing proppant, or combinations thereof.

In some embodiments, the damage or blockage may include viscosity increasing polymers. The polymer may have been introduced as a separate treatment fluid. The polymer may include, for example, polysaccharide polymer, cross-linked polymers, mannosidic and galacomannosidic linkages of guar, cellulose, cellulose derived guars, starches, xanthans, other viscosity increasing polymer, or combinations thereof.

In some embodiments, the damage or blockage may include, for example, filter cake. The filter cake may include, for example, cellulose, guars, starches, xanthans, or combinations thereof.

Time

In some embodiments, the composition is allowed to remain in the wellbore or subterranean formation for a period of time before hydrocarbon extraction resumes. The time may be more than, for example, more than 4 hours, 6 hours, 8 hours, 10 hours, 12, hours, 16 hours, 20 hours, 24 hours, 30 hours, 36 hours, 42 hours, 48 hours, 3 days, 4 days, 5 days, 1 week. The time may be, for example, less than 30 days, 4 weeks, 3 weeks, 20 days, 2 weeks, 10 days, 1 week, 5 days, 4 days, 3 days. In some embodiments, the time is sufficient to dissolve, penetrate into, react with, or mechanically alter a portion of the subterranean formation, carbonate mineralogy, clays, clay minerals, inorganic fines, organic fines, precipitates, minerals, or individual grains. In some embodiments, the time is sufficient to create or cause secondary porosity in a portion of the subterranean formation to increase permeability.

In some embodiments, at least 10 gallons of composition is introduced into the wellbore or subterranean formation. In some embodiments, at least 20 gallons, 30 gallons, 40 gallons, 50 gallons, 70 gallons, 100 gallons, 125 gallons, 150 gallons, 200 gallons, 250 gallons, or 300 gallons are introduced.

In some embodiments, the composition is introduced into the wellbore or subterranean formation which is more than 50 feet deep or below the surface. In some embodiments, the depth is more than about 100, 200, 400, 500, 700, 1000, 2000, or 5000 feet.

Gas/Pressure Production

The peroxygen may decompose from direct reduction reactions, surface catalyzed reactions, free radical decomposition reactions, or combinations thereof.

In some embodiments, the composition generates $O_2$ and/or $CO_2$ gas and creates gas pressure after being introduced into the wellbore or subterranean formation. The pressure may be sufficient to self-propagate the composition into the subterranean formation when introduced into the wellbore, or further into the subterranean formation when introduced into the subterranean formation. The pressure may serve as a gas drive, drive mechanism, or push to increase the movement, production, or recovery of hydrocarbons.

The pressure may be sufficient to move the composition to a less permeable portion of the subterranean formation. A less permeable portion may be, for example, a formation cap or boundary, interface, lenticular surface, zones of low permeability, areas where a fracture terminates, areas of a formation treated with viscous polymers that has resulted in decreased permeability. The composition increases hydrocarbon permeability of the subterranean formation and increases the relative permeability, absolute permeability, or combination thereof The pressure may be sufficient to physically alter, fragment, rubblize, fracture, crack, pit, or create fluid preferential pathways within a portion of the treated subterranean formation, thereby increasing permeability, including relative permeability, absolute permeability or both. The pressure may be sufficient to mobilize, release, migrate, realign, or redistribute clays, inorganic fines, organic fines, sand, precipitates, minerals, or individual grains of the subterranean formation or portion of the subterranean formation, thereby increasing permeability including relative permeability, absolute permeability or both. The pressure may be sufficient to release, mobilize, or remove clays, inorganic fines, organic fines, sand, precipitates, minerals, or individual grains out of the subterranean formation and into the wellbore, where they can be recovered or removed.

Some embodiments include introducing a treatment fluid, before, with or after the composition. The pressure may be sufficient cause the treatment fluid to advance, penetrate, or distribute further than in the absence of the composition. The treatment fluid may include, for example, explosive fluids or gels, peroxygens, acids, polymers, proppants, solvents, surfactants, biocides, enzymes, hydroxides, or other treatment or fracturing fluids.

In some embodiments, the composition generates $O_2$ and/or $CO_2$ gas and gas pressure longer than possible for the same amount and type of peroxygen without the use of the composition.

Fracturing

Some embodiments include introducing a treatment fluid other than the composition to fracture the subterranean formation. During or before fracturing, the composition generates $O_2$ and/or $CO_2$ gas and creates gas pressure. The pressure may be sufficient to cause the treatment fluid to further penetrate or distribute in a portion of the subterranean formation, than possible without the use of the composition. The treatment fluid may include, for example, explosive fluids or gels, gases, liquids, peroxygens, acids, polymers, proppants, solvents, surfactants, biocides, enzymes, hydroxides, other treatment or fracturing fluids, or combinations thereof. In some embodiments, the pressure is sufficient to cause fracturing of, or generating secondary porosity in the subterranean formation.

Some embodiments include fracturing the subterranean formation. Fracturing may include, for example, igniting, shooting, firing, setting off, or detonating explosive materials, propellants, or seismic instruments that fracture, shatter, rubblize, or propagate the composition into a subterranean formation. The explosives may be, for example, liquids, gases, gels, solids, shaped charges, slurry, sticks, granular solids, or any combination thereof. Fracturing may include, for example, explosive fracturing, propellant fracturing, fracturing using other high energy sources to generate sufficient gas pressure or shock wave to cause fracturing of a portion subterranean formation, and combinations thereof.

In some embodiments, the fracturing occurs in a portion of a vertical or horizontal wellbore, or in a portion of a drilled or jetted open hole lateral extending from the wellbore.

Secondary or Tertiary Hydrocarbon Recovery

In some embodiments, the composition is introduced as part of, or in combination with a secondary or tertiary hydrocarbon recovery process. The secondary or tertiary recovery technique may be, for example a water, gas, and/or chemical flood. The secondary or tertiary recovery technique may use gas and/or hot gas to push or position the composition to a desired location. The secondary or tertiary recovery technique may include, for example, an injection, thermal pulse injection, steam injection, steam assisted gravity drainage (SAGD), steam injection of water, gas, chemical flood, or combination thereof. The secondary or tertiary recovery technique may be, for example, a water alternating gas (WAG) method, steam assisted gravity drainage (SAGD), steam injection of water, gas, chemical flood, or combination thereof.

In some embodiments, the subterranean formation is a coal bed.

The composition generates $O_2$ and/or $CO_2$ gas and gas pressure. The pressure may be sufficient to provide sweep enhancement, drive, or hydrocarbon detachment and mobilization. The gas and/or gas pressure may increase the gas filled porosity of soil or rock pores which had preferential flow of water or other non-oil phase fluid, which increases sweep efficiency oil recovery by eliminating decreased sweep efficiency caused by water-filled soil and/or rock pores.

Hydrocarbon Mobilization and Detachment

In some embodiments, the composition mobilizes, detaches, or releases hydrocarbons from the subterranean formation. In some embodiments, the mobilization involves desorption of hydrocarbon from rock or sand, physical detachment, or release of hydrocarbon from formation materials The composition may generate $O_2$ and/or $CO_2$ gas and gas pressure. The pressure may be sufficient to change flow properties of, mobilize, detach, or release hydrocarbons from the subterranean formation. The gas may displace hydrocarbons from pore spaces.

The composition may reduce interfacial tension (IFT), reduce viscosity, break water-in-oil (W/O) emulsions, separate water from oil, or separate dissolved solids, mineral, clays, biological materials, organic materials, insoluble inorganics, sand, or precipitates from oil. In some embodiments, the organic materials may be, for example, asphaltene, paraffin, kerogen, or other hydrocarbon-related organic.

Oxidant Stabilization

In some embodiments, the peroxygen, surfactant, cosolvent, and alkali metal chelate are present in proportions sufficient to stabilize, extend the duration of activity, delay the decomposition of, or control the decomposition rate of the peroxygen. As a result, reacting over a longer period of time than possible with the use of a peroxygen alone Compositions Embodiments include compositions having: a) a surfactant, b) an alkali metal chelate at a concentration greater than about 0.2% and less than about 5% by weight of the non-water components and c) a cosolvent. These may be stock or concentrate compositions, or compositions diluted to working strength e.g. with water. For the ranges below, unless otherwise indicated, the concentrations are given in relation to the stock or concentrate.

The alkali metal chelates are described previously. The chelate concentration in the composition may be between about 0.01 to 5.0 percent by weight. The concentration is determined by dividing the weight of the chelate by the total weight of the composition. The concentration may be greater than about 0.01, 0.02, 0.1, 1, or 2 percent. The concentration may be less than about 5.0, 4.0, 3.0, 2.0, or 1.0, percent. The chelate concentration, relative to the non-water components may be between about 0.2 and about 5 percent by weight. The concentration relative to the non-water components is determined by dividing the weight of the chelate by the total weight of the non-water components of the composition. The concentration, relative to the non-water components, may be greater than about 0.2, 0.5, 0.7, or 1.0 percent, or less than about 5, 4.5, 4, 3.5, 3, 2.5, or 2 percent by weight.

The composition may further include water, fresh water, brine water, water from a subterranean formation, water with potassium chloride added, or any combination thereof.

The composition may have a concentration in water of about 20 to about 80 percent. The concentration is determined by dividing the total weight of the surfactant, alkali metal chelate, and cosolvent by the total weight of the composition. The concentration may be greater than about 20, 25, 30, 35, 40, or 45 percent. The concentration may be less than about 80, 75, 70, 65, 60, or 55 percent.

The composition may have a pH less than about 10.0. The pH may be less than about 10.0, less than about 9.5, less than about 9.0, less than about 8.5, less than about 8.0, greater than about 4.0, greater than about 4.5, greater than about 5.0, greater than about 5.5, greater than about 6.0. The pH may be adjusted by adding an acid or base to the composition.

The surfactants are described previously. The surfactant concentration, relative to the non-water ingredients, may be between about 5 percent and about 95%. The surfactant concentration, relative to the non-water components may be determined by dividing the weight of the surfactant by the total weight of the non-water components. The concentration, relative to the non-water components may be greater than about 5, 10, 15, 20, 25, or 30 percent or less than about 95%, 90%, 85%, or 80%.

The cosolvents are described previously. The cosolvent concentration, relative to the non-water components may be about 1 percent and about 80 percent. The concentration, relative to the non-water components may be determined by dividing the weight of the cosolvent by the total weight of the non-water components. The concentration, relative to the non-water components may be greater than about 1, 5, 7, 10, 12, or 15%, or less than about 80, 75, 70, 65, 60, 55, 50, 45, 40 percent.

In some embodiments, the composition further comprises an antioxidant. The antioxidant may be, for example, a plant-derived polyphenol. The plant-derived polyphenol may be, for example, derived from sorghum bran.

In some embodiments, the composition includes: a) about 60 to about 90 percent of a surfactant, b) about 1 to about 4 percent of an alkali metal chelate, and c) about 5 to about 30 percent of a cosolvent where all the percentages are relative to non-water components.

In some embodiments, the composition includes a) about 10 to about 40 percent of a surfactant, b) about 1 to about 4 percent of an alkali metal chelate, and c) about 40 to about 80 percent of a cosolvent where all the percentages are relative to non-water components.

In some embodiments, the composition includes: a) about 50 to about 80 percent of a surfactant, b) about 1 to about 4 percent of an alkali metal chelate, and c) about 20 to about 40 percent of a cosolvent where all the percentages are relative to non-water components.

In a method according to the invention, components or a composition that have been injected into a subterranean formation can be removed from the wellbore. A time delay can be provided before resuming the extraction of hydrocarbons from the wellbore. For example, such a time delay can range from about 1 hour, 2 hours, 6 hours, 12 hours, or 1 day, to about 1 day, 2 days, 4 days, 1 week, 2 weeks, or 1 month.

Components, such as a peroxygen, a surfactant, an alkali metal chelate, a cosolvent, water, and others, can be introduced into a subterranean formation separately, in subcombinations, or as a single composition. When the components are injected separately or in subcombinations, their aggregate pH can be defined as the pH if the components had been injected together as a single composition.

Example 1

Three oil wells, each approximately 400 ft deep located in a shallow stranded oil field in South, Texas were treated to eliminate clay, asphaltene, paraffin, and biological films that coated the inside of the well casing, clogged perforations in the well casing, and that severely reduced permeability in the near-field extending out from the wellbore into the formation, all contributing to decreasing the ability of oil to flow into these wells. Each well was treated with a range of 20 to 300 gallons treatment solution comprised of a mixture of Component A, Component B, and produced water. For some of the treatments, following the chemical injection, a well bore volume of formation water previously produced from this well was injected into the well to displace treatment solution into the well bore near field.

The diluted concentrations of treatment solutions applied in this example are as follows:

Wellbore Treatment: Component A 1%-5%; Component B 1%-4%

Well Near-Field Treatment: Component A 1%-2%; Component B 1%-4%

Prior to and at various periods during the tests, a video camera was lowered into the wells and continuous video recording of the inside of the borehole took place. Still photographs were obtained from the continuous video recording. Prior to chemical treatment, a video image was taken from the continuous downhole video from a well to show extent of blockage, and is shown in FIG. 1. It is evident that the inside of the casing is coated with a solid phase accumulation of asphaltenes, paraffins, bacteria, clays and inorganic precipitates. This photographic image is illustrative of the condition of the three wells that were treated in this example. There is no visible evidence of oil flowing to this well. Oil production prior to chemical treatment of the wells was measured to range from 0.0 BOPD (barrels oil produced daily) to less than 0.2 BOPD (0 to 8 gallons per day per well).

Figure 2:
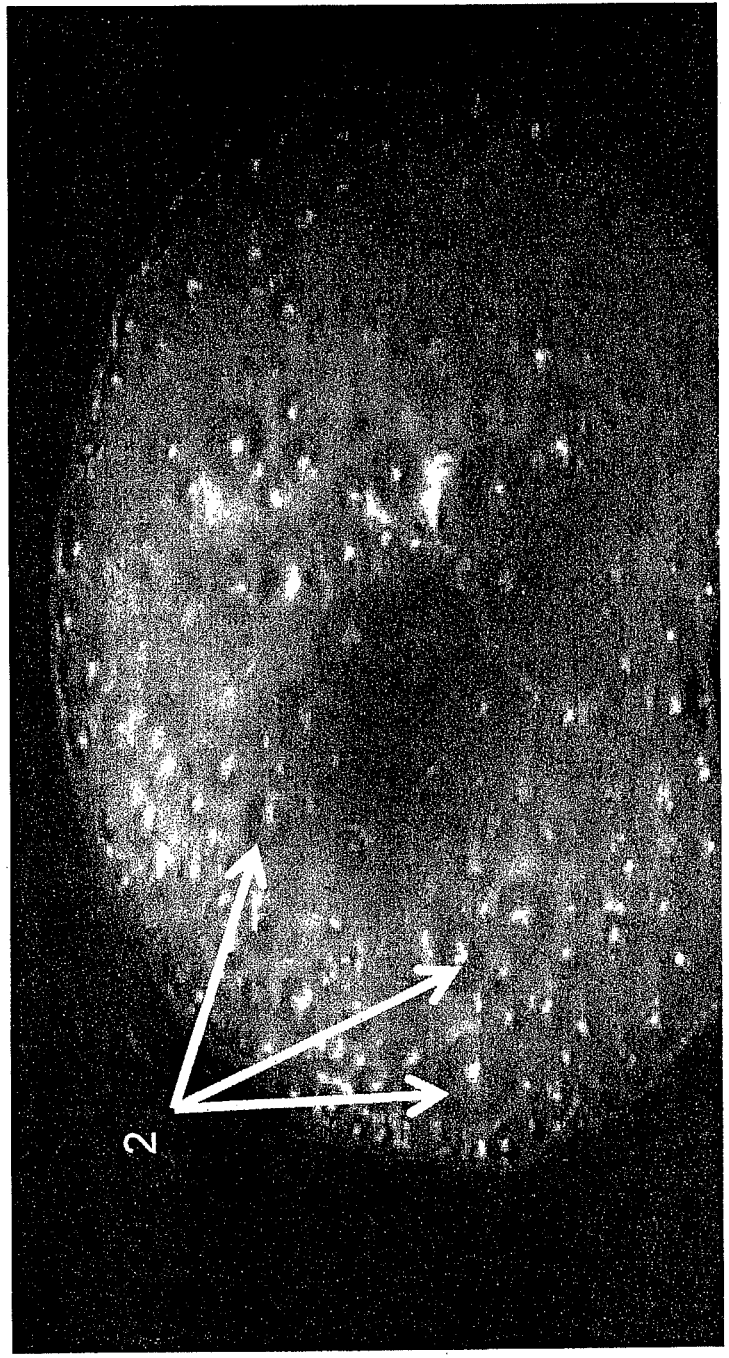
FIG. 2 shows an image from a down hole video of a test well following introduction of the composition showing gas formation and mechanical action of the composition treatment in the well bore. Arrows labeled 2 show aggressive mechanical agitation and bubbling of gas generation downhole in the well bore and perforations.

Upon addition of the treatment solution to the well and during treatment, a still photographic image was obtained from a down hole video (FIG. 2) taken from one of the test wells to record the aggressive mechanical agitation, the result of gas generation downhole in the well bore and perforations. Following a residence time of 8 to 16 hours, downhole centrifugal pumps were used to evacuate treatment liquids and solids from the wells.

Figure 3:
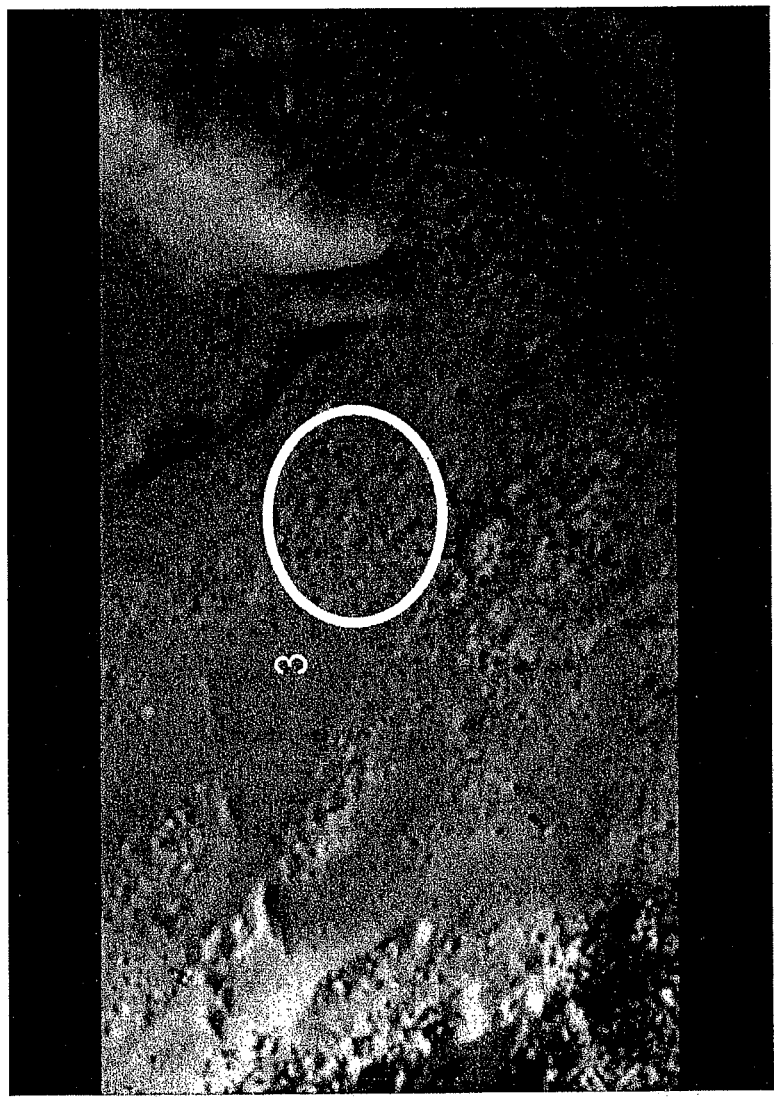
FIG. 3 shows liquefied clay/asphaltene/iron precipitate mixture removed by pumping from the test well following addition of the composition. Circle labeled 3 shows evacuated clays and solid blockages that were removed from the well bore and perforations and pumped to the surface.

Liquids pumped from the treated wells contained clays, oils, asphaltene materials and iron precipitates, along with the treatment chemicals. From one of the test wells, a significant amounts of this clay, oil, asphaltene materials and iron precipitates, were pumped out of the well thereby opening the lower 30 ft perforated section of the well. The residual material pumped from this well can be seen in FIG. 3. FIG. 3 shows an example of the evacuated solids that were removed from the well bore and perforations and pumped to the surface, mostly consisting of delaminated and non-cohesive clays depicting flowable characteristics that readily enable pumping as a liquid.

Figure 4:
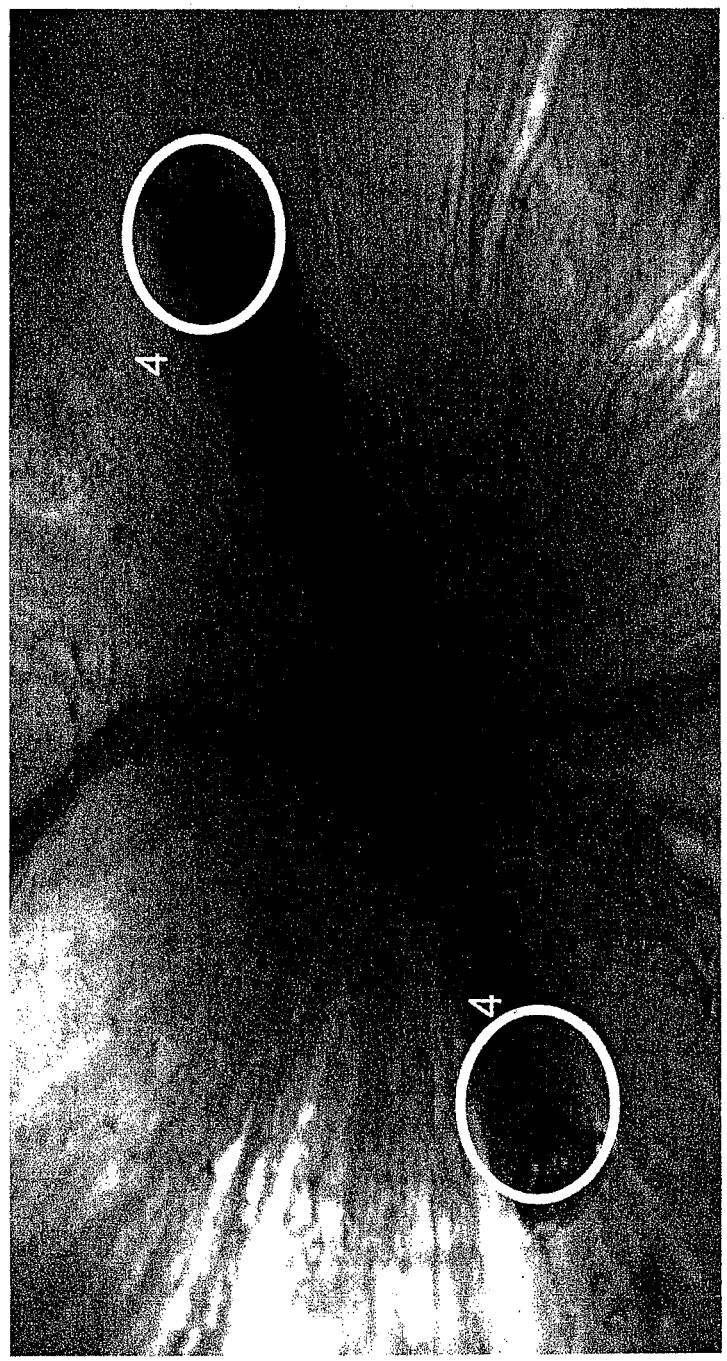
FIG. 4 shows an image of wellbore and perforations from a down hole video of a test well within 24 hours after introduction of the composition showing oil entering the well with gas bubbles escaping into the well bore. Circles labeled 4 show restored flow of oil into the wellbore as a result of treatment with the composition.

Within 24 hours following the treatment of the well bore and perforations to remove blockages and restore flow to the well, oil can be seen entering the casing perforations in the oil bearing zone from the still photographic image obtained from the down hole video in FIG. 4. Gas bubbles can be observed coming out of the perforations, providing pressure and cleaning extending into the near field around the well.

Figure 5:
FIG. 5 shows a liquefied clay blockage being pushed through casing perforations after introduction of the composition in the near field region around the well. Image is a still photograph from continuous video at time=3.00 minutes. Circles labeled 5 show the composition degrading and clearing clay plugs, blockages, and formation damage from the wellbore perforations.

A example of this can be readily observed from continuous video photographic images taken inside the well bore casing following treatment by the well bore cleaner. Examination of the video log reveals a continuous process of purging inorganic and organic materials, including silts and clays from the near field formation outside of the well casing, through the perforations an into the well. Liquified clay plugs can be seen passing through the well bore perforation on both left and right sides of the well casing in FIG. 5. The video camera was left in a constant fixed position in the well for a period of time. It is also evident in FIG. 5 and from the video log that gas pressure is being released through the perforations and is the driving force pushing the liquefied inorganic and organic materials, including silts and clays from the near field outside of the well casing and into the well. The time record of the video camera when the still image was obtained from the video log was 3.00 minutes. Review of additional still images obtained from the video log at 3.02 minutes show the release of the plug from and perforation and the beginning of oil flowing into the well following the purging of the liquefied inorganic and organic materials. An additional purging of liquefied inorganic and organic materials through the same perforations was observed at Time=3.20 minutes. At Time=3.33, following purging of the liquefied inorganic and organic materials, additional oil can be seen entering the well through the same perforations. This process was observed to continually take place during the video logging of this well. A continuous process of purging liquefied inorganic and organic materials, including silts, clays, precipitates mobilized by the treatment solution through the well casing perforations followed by release oil was observed along the perforated zone of the well casing. The video camera was moved to a new location in the well bore casing to take the video from which additional still photographic images were obtained. This continuous process of purging solids from the near field outside of the well casing is evidenced by the purging of a large liquefied slug from the well casing recorded at Time=19.05 minutes of the down hole vide, followed by the release of the slug from the perforation at Time=19.08 minutes.

Figure 6:
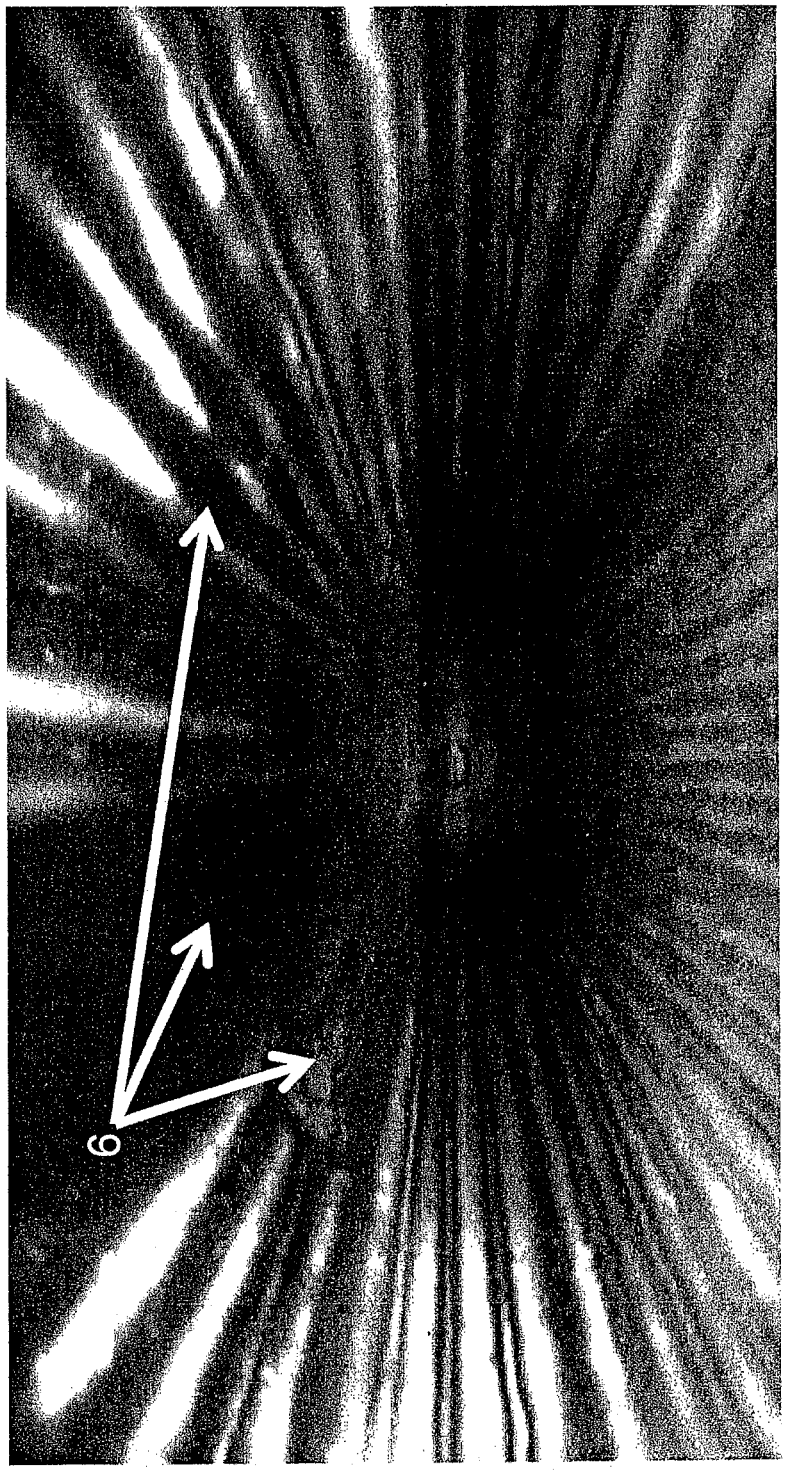
FIG. 6 shows an image from a down hole video of a test well following introduction of the composition to well bore and near field. Arrows labeled 6 indicate oil entering the well and flowing down the well casing following introduction of the composition to the well bore and near field.

The effects of the well bore and near field treatment of one of the Test Wells is evident, based on the still photographic image taken from a down hole video, as seen in FIG. 6. Oil production 28 days following said chemical treatment of the wells was measured to range from 0.78 BOPD to 1.14 BOPD (33 to 48 gallons per day per well). This reflects more than a 600% increase in flow and oil production continuing 30 days after treatment.

Example 2

Composition creating secondary porosity and increased permeability at 70 degrees F. in a core of sandstone material from a heavy oil subterranean formation.

The procedure was as follows: Tightly confine a 1 Kg sample of hydrocarbon bearing sandstone material in a section of steel pipe. Regional analysis indicates the subterranean material to be characterized as a fine-grained sandstone containing high percentages of clay minerals consisting of kaolinite, illite, and smectite. Average porosity and permeability values reported for cores of the oil bearing subterranean formation are 26.5%, and 81 millidarcy (mD), respectively.

Add 250 ml of the diluted concentrations of the composition as a treatment solution applied in this example of 1% Component A and 3% Component B mixed with filtered water. Treatment solution was allowed to gravity flow into the core sample, and maintained at constant temperature of 70 to 72 degrees F. for 48 hours.

Figure 7:
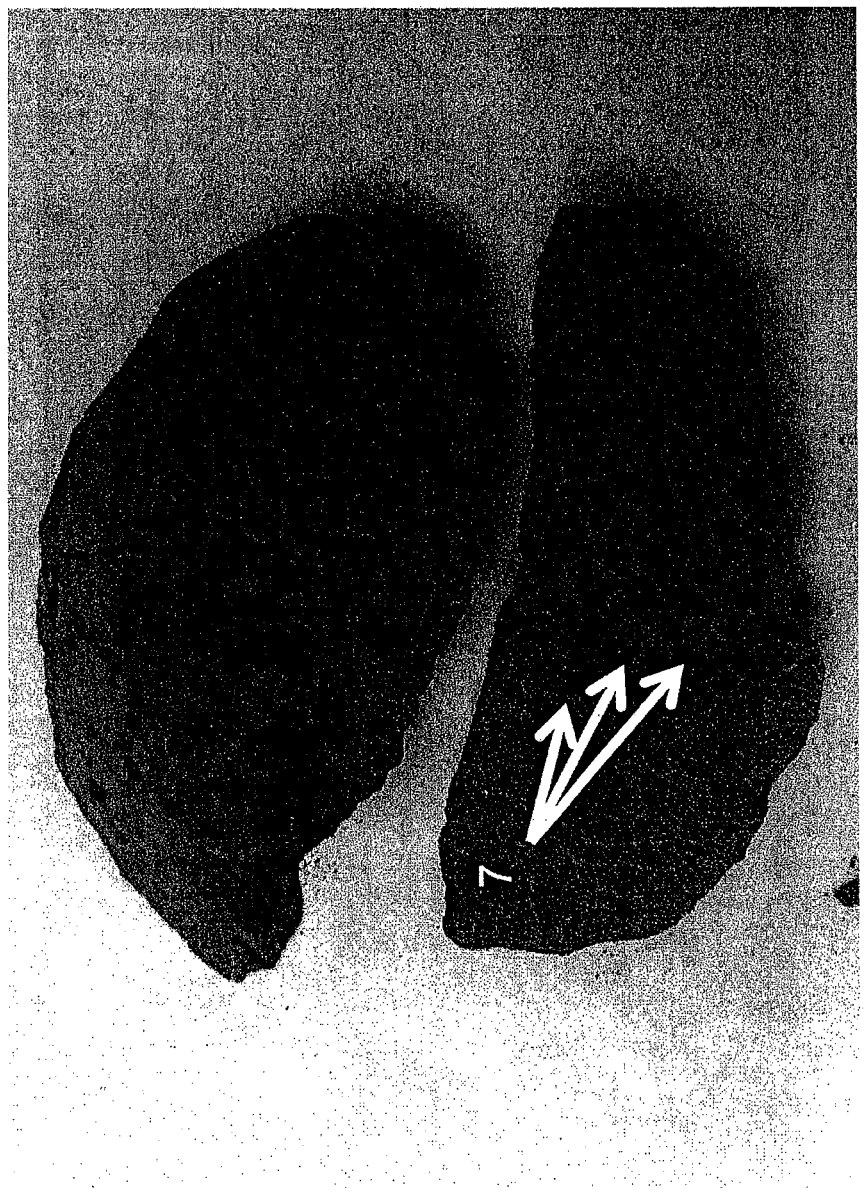
FIG. 7 shows treated sandstone material from a heavy oil subterranean formation. Arrows labeled 7 indicate a network of secondary porosity consisting of pits and fractures formed by the composition.

Starting 3 hours after applying treatment solution, and continuing for at least 26 hours, the sample core was observed to physically rise and heave, and gas generated in-situ of the sample core escaped at the surface. After 96 hours, the sample core was extracted and split. As shown in FIG. 7, the treatment solution penetrated the throughout sample core and formed a network of secondary porosity consisting of pits and fractures.

Example 3

Composition penetrating shale layer in a hydrocarbon bearing subterranean formation and generating sufficient in-situ gas and pressure at 82 degrees F. to fragment shale layer causing secondary porosity and increased permeability.

The procedure was as follows: Flush with water a 300 foot cased test wellbore to ensure the wellbore is free of any debris to the bottom of the well. Pump flush water from the test wellbore until evacuated. Introduce 150 gal of the diluted concentrations of the composition as a treatment solution applied in this example of 1.8% Component A and 8% Component B mixed with produced water previously obtained from the wellbore. The entire volume of treatment solution was allowed to gravity flow into the test wellbore. Following, a 100 gal water chase was slowly pumped (8 gpm) behind the treatment solution to displace the treatment solution from the wellbore and into the targeted subterranean formation containing a shale layer with no associated natural gas. The water chase was pumped at a rate of 2 to 8 gpm and at a pressures from 6 psi to 100 psi; the rates and pressures remained well below reservoir fracturing pressures. The test wellbore was completely filled with water and the well sealed at the surface.

Regional analysis indicates the wellbore was completed and is perforated across subterranean material to be characterized as a fine-grained hydrocarbon bearing sandstone containing high percentages of clay minerals consisting of kaolinite, illite, and smectite, and highly lenticular with clay and shale layers throughout the perforated section of the well.

Formation temperature was 82 degrees F.

Initial surface pressure readings at the well head were 0 psi following the injection of treatment fluids. The pressure in the test wellbore was observed to begin rising steadily after 2 to 3 hours following treatment injection, and continued to rise over the next 4 hours until blowing the surface packer from the wellbore. Gas was continually observed bubbling and escaping from the open wellbore over the next 30 hours, at which time poly tubing was lowered to the bottom of the wellbore and clean water was pumped into the wellbore at sufficient rate to flush solids from the wellbore and onto the ground surface surrounding the test wellbore.

Figure 8:
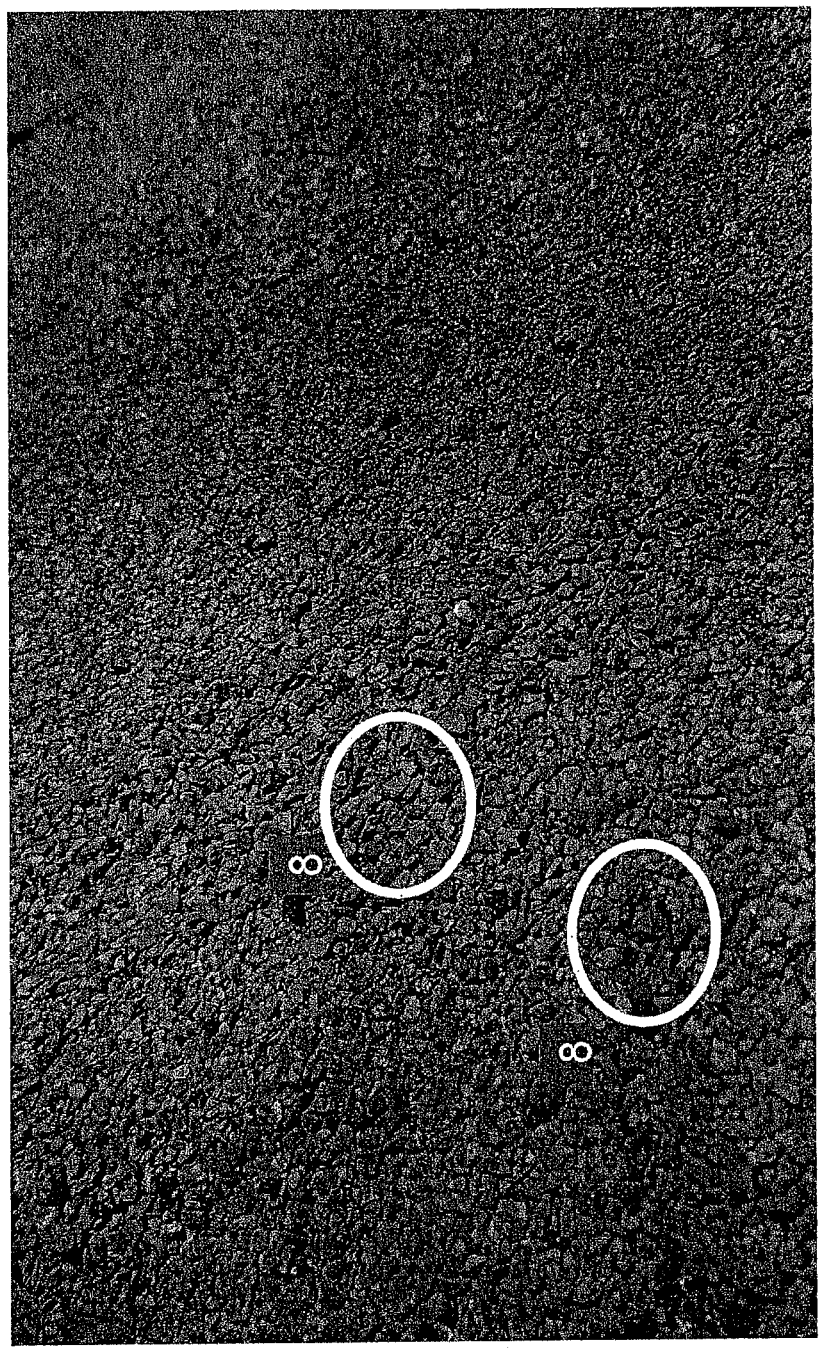
FIG. 8 shows rubbilized or fragmented shale flushed to the surface of a test wellbore following introduction of the composition to the subterranean formation. Circles labeled 8 show fragmented shale resulting from treatment with the composition.

As shown in FIG. 8, after water flushing the test wellbore, the ground surface surrounding the test wellbore was observed to be littered with fragments of shale with an approximate average diameter of ⅜ of an inch (0.375 inches). The placement, volume, pressure, and energy of in-situ gas generated as a result of the injected composition based treatment solution, resulted in the shale being fragmented in the subterranean formation with sufficient force to cause a quantity of the shale fragments to be removed from the formation and pushed through the ½ inch (0.5 inch) diameter perforations and into the wellbore.

Example 4

Composition used in treating clay in the wellbore and subterranean formation; resulting in the altered clay no longer exhibiting the typical clay characteristics and swelling potential when exposed to water that cause permeability damage or reduce fluid flow.

The procedure was as follows: Flush with water a 400 foot cased test wellbore to ensure the wellbore is free of any debris or formation materials to the bottom of the well. Introduce 100 gal of the diluted concentrations of the composition as a treatment solution applied in this example of 0.5% Component A and 1% Component B mixed with fresh water obtained from a second and shallower well. The entire volume of treatment solution was allowed to gravity flow into the test wellbore, perforations, and formation face. The volume of treatment solution filled the wellbore to cause a static fluid level to reside above the wellbore perforations and across the face of the hydrocarbon bearing subterranean formation. The composition based treatment fluid was shut in for at least 24 hours. The test wellbore was open to the atmosphere throughout the test.

Regional analysis indicates the wellbore was completed and is perforated across subterranean material to be characterized as a fine-grained hydrocarbon bearing sandstone containing high percentages of clay minerals consisting of kaolinite, illite, and smectite, and highly lenticular with clay and shale layers throughout the perforated section of the well.

Formation temperature was estimated at 74 to 78 degrees F. based on depth and seasonal weather conditions.

Activity in the wellbore in the way of echoes from fluid splashing and lapping on the side walls of the wellbore casing could be heard at the surface of the open wellbore 2 to 3 hours following treatment fluid application, and continued throughout the 24 hour test. At which time a submersible pump attached to the end of poly tubing was lowered to the bottom of the wellbore and the contents of the wellbore were pumped into a container at ground surface. Samples were collected of the produced treatment fluids returned to the surface, and are shown in FIG. 9.

Figure 9:
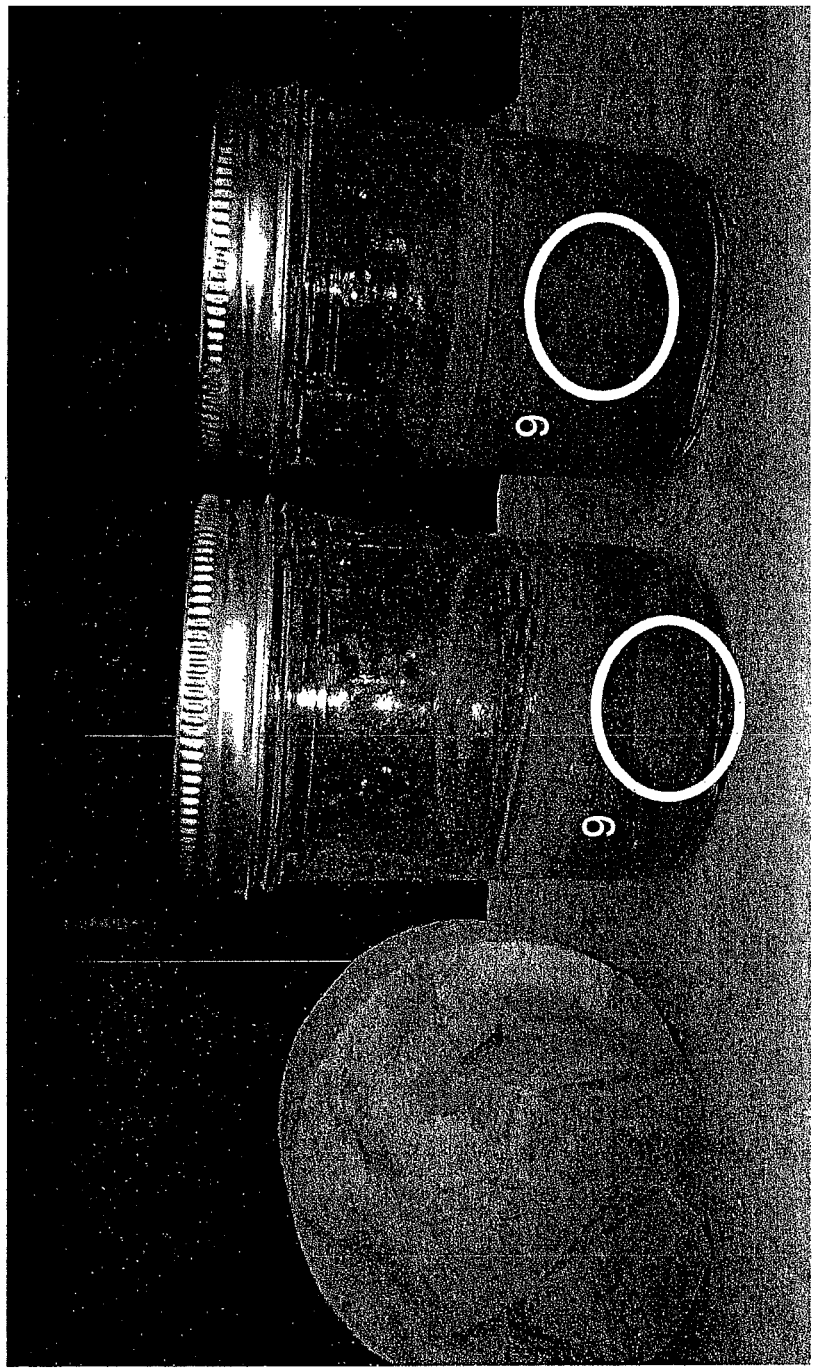
FIG. 9 shows a core of subterranean clay obtained during drilling of the wellbore before introduction of the composition and showing structural competence of untreated clay (LEFT); settled fluids pumped from a wellbore after introduction of the composition showing clay behaving physically as ultra fine sand (MIDDLE); and settled fluids slightly shaken to show clay readily re-suspends in water with no indication of clumping or swelling (RIGHT). Circles labeled 9 show the clay either settled or resuspended.

As can be seen by the core in the far left of FIG. 9, the clays found in the hydrocarbon bearing formation in the area of the test wellbore are structurally competent. They exhibit characteristically very low to no permeability, and will swell in the presence of water and other introduced fluids to further seal off or significantly decrease formation permeability, cause permeability damage or blockages, and will clog pumps used to produce fluids from the wellbore. The sample in the middle of FIG. 9 is an actual aliquot of fluids produced from the test wellbore after treatment. This sample shows that after treatment, the clay could be readily pumped from the wellbore as entrained within the produced water without swelling or clogging the pump. The clay particles exhibited a Brownian settling velocity (indicating that water is readily moving between and within the individual clay particles) and pattern characteristic of a non-cohesive or non-colloidal ultra fine grain material. In the far right of FIG. 9 is shown a sample of produced fluids from the test wellbore that after settling, was slightly agitated to demonstrate that the concentration of treated clay readily re-suspends in water and begins to settle out again without exhibiting swelling or clumping.

Example 5

Composition used in reducing viscosity, and separating water and solids from a heavy water-bound oil at temperatures below that of the subterranean formation which produced the oil.

The procedure was as follows: 10 g of San Miguel oil was treated with 0.1% Component A concentrate on a weight basis. The sample vials were gently rolled for 3 seconds upon application of the treatment fluid to the oil in order to somewhat initially distribute the composition within the oil matrix. The samples were not stirred. The treated and a control sample were maintained at 90 to 94 degrees F. for 96 hours. The static temperature of the San Miguel formation at the wellbore where the oil samples were collected is 129 degrees F. Typical production for this water-bound oil is to surface treat it with heat at 170 deg. F. to 190 deg. F. in order to break out the water from the oil at a level that meets market purchase specifications.

Figure 10:
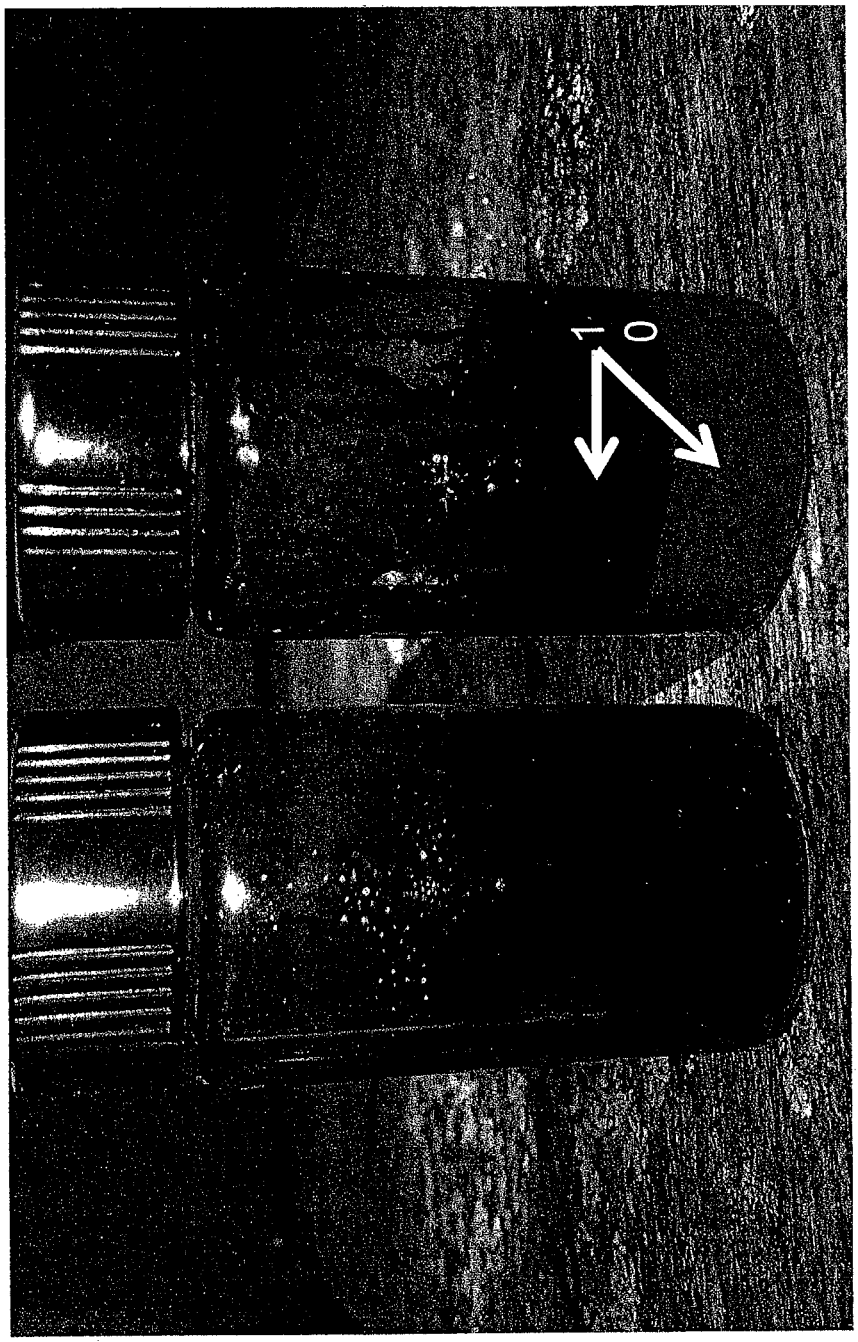
FIG. 10 shows the composition separating water a solids from a heavy water-bound oil at temperatures less than the static formation temperature, without addition of heat. San Miguel Heavy Water-Bound Oil Test, Time=24 HRS after introduction of the composition at 90 F-92 F. Arrows labeled 10 show water separated from heavy water-bound oil at low temperatures.

As shown in FIG. 10, the composition treatment separated water and solids from the heavy water-bound oil at temperatures significantly below static formation temperatures or typical surface heat treating temperatures.

Measured viscosity values for the treated heavy water-bound oil over the first 48 hours are significantly reduced in comparison to untreated oil:

| | |
|---|---|
| T = 0 hr | 590 cp (before treatment) |
| T = 24 hr | 290 cp |
| T = 48 hr | 291 cp |

Example 6

Composition used in water flood test to remediate biological, clay and other blockages in injection wellbores, and to demonstrate the in-situ production of gas to increase production flow at extraction wells.

In this example, three waterflood injection wells were located inside an outer zone of 8 oil extraction wells producing fluids from the same subterranean formation. Extraction wells are located at a spacing of about 300 feet from the injection wells and each other. Prior to this treatment example, water injection/extraction wells were continuously operating, with a reported increase in injection well head pressure and decreased volumetric injection flowrates, with a decreasing and low yield of oil production in the extraction wells over time. Prior to treatment, the cumulative volumetric flowrate of water injected into the three injection wells was less than 15 BOWPD (barrels of water per day) and at an injection pressure of approximately 850 psig. It was reported by the well operators that there had been a decrease in volumetric injection flowrates, with a decreasing and low yield of oil at less than 1.3 BOPD. Decreased production of oil in the extraction wells was attributed to heavy oil, no gas drive in the formation, and the presence of iron reducing bacteria, black organic solids, asphaltenes, clays and biofilm slime. Strong anaerobic odors were noted in the injection and extraction wells.

No gas was produced during normal operations prior to the invented chemical well bore/near field treatment and prior to the chemical flood treatment.

Before treatment, each of the three injection wellbores was flushed with water. After the flushing, a 300 gal composition based treatment solution consisting of 1% Component A and 0.5% Component B mixed with produced water from the lease was pumped into the wellbore and into the. The treatment fluid was then displaced from the wellbore by pumping an additional 150 gallon water chase into the wellbore. All injection wells were shut in at around 750-790 psi surface pressure, and for 24 hours to allow for chemical treatment of the wellbore and near field area of the subterranean formation.

Twenty-four hours after the initial injection of the composition into the injection wells and into the subterranean formation, a continuous injection of waterflood fluids consisting of produced water augmented with 0.1% Component A and 0.1% Component B was initiated at a rate of 420 gallons per day.

The morning following injector well treatments (12 to 24 hrs after injector well treatments, then shut in), surface pressures at the injector wells were 350 for injector #1, 380 for #2 and 300 for #3. These pressures were approximately equal to downhole reservoir pressures, and indicated that oxygen and carbon dioxide gas generated in-situ from the volumes of composition placed into the subterranean formation through the injector treatments had dispersed out into the formation toward production wells. Therefore there was a release of pressure from each injection well into the formation after the wells were shut in and before the waterflood operations continued. When the injector wells were put back online at similar flow rates to those used prior to well treatment, the pressures varied from 250 to 400 psig (less than half pretreatment levels). Operators were able to increase (double) volumetric waterflood injection flow rates, in comparison to maximum volumetric flow rates prior to the invented process treatment. The required pressure achieve this doubling of volumetric injection flow rates was 700 psig, which is still lower than the injection pressures required prior to treatment at half the volumetric flow rates.

Once injection and extraction wells were brought back online for normal operations, the existence of gas and increased oil production flow rates were observed at 5 of the 8 extraction wells.

The embodiments illustrated and discussed in this specification are intended only to teach those skilled in the art ways to make and use the invention known to the inventors. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES

Seng, J. J., *Modern Chemical Enhanced Oil Recovery: Theory and Practice*. Gulf Professional Publishing. ISBN 978-1-85617-745-0. 2011.

Lake, L. W. "Enhanced Oil Recovery," *Prentice Hall*, New Jersey, 1989.

Pope, G. A., Ben Wang. and Kenning Tsaur, F. G. "A Sensitivity Study of Micellar-Polymer Flooding," *Society of Petroleum Engineering Journal*, 19, 357-358 (1979).

Healy, R. N., Reed, R. L., Stenmark, D. G., (1976) Mulitphase Microemulsion Systems. *Society of Petroleum Engineering Journal* (June), 147-160. Trans. AIME, 261.

Boston, W. G., Brandner, C. F., and Foster, W. R., Recovery of Oil by Waterflooding from and Argillaceous Oil-Containing Subterranean Formation. U.S. Pat. No. 3,740,956, Oct. 7, 1969.

Martin, J. C. (1959) The Effect of Clay on the Displacement of Heavy Oil by Water. Paper SPE 1411-G presented at the $3^{rd}$ Annual Meeting, Caracas, Venezuela, October 14-16.

Bernard, G. G. (1967) Effect of Floodwater Salinity of Recovery of Oil from Cores Containing Clays. Paper SPE 1725 presented at the $28^{th}$ Annual California Regional Meeting, Los Angeles, Calif., October 26-27.

U.S. Patent Application US2005/0215439 A1, Blair, C. C. "Clay Stabilization in Sub-Surface Formations", Sep. 29, 2005.

U.S. Patent US2011/0180255A1, Rousseau, D. and Tabary, R. "Enhanced Oil Recovery Method using Associative Polymers", Jul. 28, 2011.

U.S. Pat. No. 7,284,610B2, Poelker, D. J., McMahon, J., and Schield, J. A., "Polyamine Salts as Clay Stabilizing Agents", Oct. 23, 2007.

U.S. Pat. No. 5,247,995, Tjon-Jow-Pin, R., Brannon, H. D., and Rickards, A. R. "Method of Dissolving Organic Filter Cake Obtained from Polysaccharide Based Fluids Used in the Production Operations and Completion of Oil and Gas Wells", Sep. 28, 1993.

U.S. Pat. No. 7,923,417, Sanders, M. W., Mundy, J. L., Foo, F. F., and Saini, R. K. "Compositions and Methods for Breaking Viscosity Increasing Polymer at Very Low Temperature in Downhole Well Applications', Apr. 12, 2011.

U.S. Pat. No. 7,928,040, Sanders, M. W., Mundy, J. L., Foo, F. F., and Saini, R. K. "Compositions and Methods for Breaking Viscosity Increasing Polymer at Very Low Temperature in Downhole Well Applications', Apr. 19, 2011.

U.S. Pat. No. 4,447,342, Borchardt, J. K., and Brown, D. L. "Method of Clay Stabilization in Enhanced Oil Recovery", May 8, 1984.

Oil & Gas Docket No. 8A-0240292

We claim:

1. A method for enhancing hydrocarbon recovery in a subterranean formation having a blockage or accumulation of material, comprising:
    introducing components comprising a) a peroxygen, b) a surfactant, c) an alkali metal chelate, and d) a cosolvent into a hydrocarbon bearing subterranean formation with a blockage or accumulation of material,
    generating at least one of oxygen gas and carbon dioxide gas via decomposition of the peroxygen to create gas pressure in the subterranean formation, and
    mobilizing, degrading, removing, releasing, realigning or redistributing the material creating the blockage or accumulation in the subterranean formation physically via generated gas pressure and solubilization by the surfactant,
    wherein the aggregate pH of the components is less than about 10 and/or a concentration of alkali metal chelate is greater than about 0.2% and less than about 5% by weight of non-water components.

2. The method of claim 1, wherein the peroxygen is selected from the group consisting of hydrogen peroxide, a source of hydrogen peroxide, sodium persulfate, potassium persulfate, and combinations.

3. The method of claim 1, wherein the peroxygen is introduced into the subterranean formation at a concentration between about 0.01 and about 20 percent.

4. The method of claim 1, wherein the chelate concentration in the components introduced into the subterranean formation is between about 0.00001 and about 5.0 percent by weight.

5. The method of claim 1, wherein the components are introduced into a wellbore in the subterranean formation.

6. The method of claim 5, further comprising sealing the wellbore after introducing the components.

7. The method of claim 5, further comprising removing the components from the wellbore and then extracting hydrocarbon materials after a time delay.

8. The method of claim 5, wherein the wellbore is more than 50 feet deep.

9. The method of claim 1, wherein the components are introduced into the subterranean formation without a wellbore.

10. The method of claim 1, wherein at least 10 gallons of the components is introduced into the subterranean formation.

11. The method of claim 1, wherein the components are introduced into the subterranean formation by at least one from the group consisting of pumping, displacing, and locating the components at a desired location and at a rate and pressure equal to or greater than the reservoir hydraulic fracture pressure.

12. The method of claim 1, further comprising fracturing the subterranean formation.

13. The method of claim 1, wherein the peroxygen decomposes from at least one from the group consisting of a direct reduction reaction, a surface catalyzed reaction, and a free radical decomposition reaction.

14. The method of claim 1, wherein hydrocarbons are mobilized, detached, or released from the subterranean formation.

15. The method of claim 1, further comprising: allowing the components to contact clay or a clay mineral in the subterranean formation, so that the clay or clay mineral is denatured, delaminated, stabilized, exhibits reduced swelling, or has swelling prevented, causing an increase in the flow, production, or recovery of hydrocarbons.

16. The method of claim 1, further comprising: allowing the components to contact blockage or damage in the subterranean formation, thereby altering, removing, degrading or dissolving the damage or blockage to increase a permeability, a relative permeability, or an absolute permeability of the subterranean formation causing an increase in the flow, production, or recovery of hydrocarbons.

17. The method of claim 1, further comprising: applying, igniting, shooting, firing, setting off, or detonating an explosive material, propellant, or seismic instrument, so that pressure, a gas wave, or a shock wave fractures, shatters, rubblizes, or propagates a treatment into the subterranean formation, thereby increasing a permeability, a relative permeability, or an absolute permeability of the subterranean formation and causing an increase in the flow, production, or recovery of hydrocarbons.

18. The method of claim 1, further comprising: drilling or jetting a lateral open hole or monobore into the subterranean formation, thereby increasing a permeability, a relative permeability, or an absolute permeability of the subterranean formation and causing an increase in the flow, production, or recovery of hydrocarbons.

* * * * *